(12) United States Patent
Kates

(10) Patent No.: US 7,455,236 B2
(45) Date of Patent: Nov. 25, 2008

(54) ZONE THERMOSTAT FOR ZONE HEATING AND COOLING

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 0 days.

(21) Appl. No.: 11/613,090

(22) Filed: Dec. 19, 2006

(65) Prior Publication Data

US 2007/0119957 A1 May 31, 2007

Related U.S. Application Data

(63) Continuation of application No. 10/959,494, filed on Oct. 6, 2004, now Pat. No. 7,156,316.

(51) Int. Cl.
- *F24F 11/00* (2006.01)
- *F24F 3/00* (2006.01)
- *G05D 23/00* (2006.01)

(52) U.S. Cl. .................. 236/1 B; 236/49.3; 236/94; 165/208

(58) Field of Classification Search ............. 236/1 B, 236/49.3, 94; 165/205, 208, 217
See application file for complete search history.

(56) References Cited

U.S. PATENT DOCUMENTS

| | | |
|---|---|---|
| 3,724,534 A | 4/1973 | Weatherston |
| 4,417,687 A | 11/1983 | Grant |
| 4,716,957 A | 1/1988 | Thompson et al. |
| 4,754,697 A | 7/1988 | Asselbergs |
| 4,809,593 A | 3/1989 | Asselbergs |
| 4,824,012 A | 4/1989 | Tate |
| 4,830,095 A | 5/1989 | Friend |
| RE32,960 E | 6/1989 | Levine |
| 4,846,399 A | 7/1989 | Asselbergs |
| 4,886,110 A | 12/1989 | Jackson |
| 4,942,348 A | 7/1990 | Nilssen |

(Continued)

FOREIGN PATENT DOCUMENTS

CA    1187966 A1    5/1985

(Continued)

OTHER PUBLICATIONS

Office Action dated May 31, 2006 from Related U.S. Appl. No. 10/959,361.

(Continued)

*Primary Examiner*—Marc E Norman
(74) *Attorney, Agent, or Firm*—Knobbe, Martens, Olson & Bear, LLP

(57) ABSTRACT

A zone thermostat for use in connection with an Electronically-Controlled Register vent (ECRV) that can be easily installed by a homeowner or general handyman is disclosed. The ECRV can be used to convert a non-zoned HVAC system into a zoned system. The ECRV can also be used in connection with a conventional zoned HVAC system to provide additional control and additional zones not provided by the conventional zoned HVAC system. In one embodiment, the ECRV is configured have a size and form-factor that conforms to a standard manually-controlled register vent. In one embodiment, the zone thermostat is configured to provide thermostat information to the ECRV. In one embodiment, the zone thermostat communicates with a central monitoring system that coordinates operation of the heating and cooling zones.

28 Claims, 20 Drawing Sheets

U.S. PATENT DOCUMENTS

| | | |
|---|---|---|
| D310,873 S | 9/1990 | Asselbergs |
| 5,301,101 A | 4/1994 | MacArthur et al. |
| 5,303,767 A * | 4/1994 | Riley .................. 165/208 |
| 5,318,104 A | 6/1994 | Shah et al. |
| 5,348,078 A | 9/1994 | Dushane et al. |
| 5,364,304 A | 11/1994 | Hampton |
| 5,449,319 A | 9/1995 | Dushane et al. |
| 5,489,238 A | 2/1996 | Asselbergs |
| 5,495,887 A | 3/1996 | Kathnelson et al. |
| 5,533,668 A | 7/1996 | Erikson |
| 5,622,221 A | 4/1997 | Genga et al. |
| 5,711,480 A | 1/1998 | Zepke et al. |
| 5,810,245 A | 9/1998 | Heitman et al. |
| 5,944,098 A | 8/1999 | Jackson |
| 6,145,752 A | 11/2000 | Jackson |
| 6,250,382 B1 | 6/2001 | Rayburn et al. |
| 6,322,443 B1 | 11/2001 | Jackson |
| 6,488,081 B2 | 12/2002 | Rayburn et al. |
| 6,491,094 B2 | 12/2002 | Rayburn et al. |
| 6,912,429 B1 | 6/2005 | Bilger |
| 6,983,889 B2 * | 1/2006 | Alles .................. 236/49.1 |
| 7,014,124 B2 | 3/2006 | Gottlieb |
| 7,156,316 B2 | 1/2007 | Kates |
| 7,163,156 B2 | 1/2007 | Kates |
| 7,168,627 B2 | 1/2007 | Kates |
| 2001/0048030 A1 | 12/2001 | Sharood et al. |
| 2002/0017107 A1 | 2/2002 | Bailey et al. |
| 2005/0082053 A1 | 4/2005 | Halabi |
| 2005/0156731 A1 | 7/2005 | Chapman, Jr. et al. |
| 2005/0284622 A1 | 12/2005 | Nichols |
| 2006/0071086 A1 | 4/2006 | Kates |
| 2006/0071087 A1 | 4/2006 | Kates |
| 2006/0071089 A1 | 4/2006 | Kates |
| 2006/0105697 A1 | 5/2006 | Aronstam et al. |
| 2007/0037507 A1 | 2/2007 | Liu |
| 2007/0082601 A1 | 4/2007 | Desrochers et al. |
| 2007/0095518 A1 | 5/2007 | Kates |
| 2007/0102149 A1 | 5/2007 | Kates |
| 2007/0119958 A1 | 5/2007 | Kates |
| 2008/0179052 A1 | 7/2008 | Kates |
| 2008/0179053 A1 | 7/2008 | Kates |

FOREIGN PATENT DOCUMENTS

| | | |
|---|---|---|
| EP | 0632234 | 1/1995 |
| EP | 0710804 A2 | 5/1996 |
| EP | 0710804 A3 | 12/1997 |
| WO | WO 2006-041599 A2 | 4/2006 |
| WO | WO 2006-041599 A3 | 4/2006 |

OTHER PUBLICATIONS

Notice of Allowance dated Oct. 11, 2006 from Related U.S. Appl. No. 10/959,361.
Office Action dated May 31, 2006 from Related U.S. Appl. No. 10/959,362.
Notice of Allowance dated Oct. 11, 2006 from Related U.S. Appl. No. 10/959,362.
Office Action dated Apr. 27, 2006 from Related U.S. Appl. No. 10/959,494.
Notice of Allowance dated Oct. 26, 2006 from Related U.S. Appl. No. 10/959,494.
"A 6-in-1 Device: Intelligent Residential Control Introduced by Carrier," http://www.global.carrier.com/details/0..CLI1_DIV28_ETI8093.00.html, 3 pages.
"Automatically Control Your In-Wall or In-Floor Registers!," http://www.smarthome.com/3096.html, 1 page.
"Automation for Your Home," RCS Product Catalog, Jun. 2004, 14 pages.
"Comfort System™: Commercial VAV & Zone Control Systems," Product Specification, 14 pages.
"DIY Zoning: Dampers," http://diy-zoning.sourceforge.net/Advanced/dampers.html, 3 pages.
"DIY Zoning: Passive Mode," http://diy-zoning.sourceforge.net/Advanced/passive_mode.html, 2 pages.
"DIY Zoning: Total Control," http://diy-zoning.sourceforge.net/Advanced/total_control.html, 3 pages.
"DIY Zoning: Technical FAQ," http://diy-zoning.sourceforge.net/Advanced/faq.html, 11 pages.
"DIY Zoning: Can I Do It?" http://diy-zoning.sourceforge.net/Advanced/prerequisites.html, 4 pages.
"DIY Zoning: Release Notes," http://diy-zoning.sourceforge.net/Advanced/release_notes.html, 4 pages.
"6 Zone HVAC Control Unit," Product Specification for RCS Model ZC6R, 2 pages.
"Want to Prevent Over Pressure Buildup in Your HVAC System?" http://www.smarthome.com/3072.html, 1 page.
"Indoor: Home Comfort: Fans/Air Conditioning: Blower Booster," http://www.improvementscatalog.com/product.asp?product=49254zz&dept%5Fid=10100.html, 1 page.
Office Action dated Jan. 16, 2008 from Related U.S. Appl. No. 11/613,116.
Office Action dated Apr. 23, 2008 from Related U.S. Appl. No. 11/613,116.
Office Action dated Nov. 15, 2007 from Related U.S. Appl. No. 11/613,110.
Office Action dated Feb. 1, 2008 from Related U.S. Appl. No. 11/613,110.
Office Action dated Jul. 22, 2008 from Related U.S. Appl. No. 11/613,110.

* cited by examiner

FIG. 3A  FIG. 3B

ZONE THERMOSTAT FOR ZONE HEATING AND COOLING

REFERENCE TO RELATED APPLICATIONS

This application is a continuation of application Ser. No. 10/959,494, filed Oct. 6, 2004, titled "ZONE THERMOSTAT FOR ZONE HEATING AND COOLING," the entire contents of which is hereby incorporated by reference.

BACKGROUND OF THE INVENTION

1. Field of the Invention

The present invention relates to a system and method for directing heating and cooling air from an air handler to various zones in a home or commercial structure.

2. Description of the Related Art

Most traditional home heating and cooling systems have one centrally-located thermostat that controls the temperature of the entire house. The thermostat turns the Heating, Ventilating, and Air-Conditioner (HVAC) system on or off for the entire house. The only way the occupants can control the amount of HVAC air to each room is to manually open and close the register vents throughout the house.

Zoned HVAC systems are common in commercial structures, and zoned systems have been making inroads into the home market. In a zoned system, sensors in each room or group of rooms, or zones, monitor the temperature. The sensors can detect where and when heated or cooled air is needed. The sensors send information to a central controller that activates the zoning system, adjusting motorized dampers in the ductwork and sending conditioned air only to the zone in which it is needed. A zoned system adapts to changing conditions in one area without affecting other areas. For example, many two-story houses are zoned by floor. Because heat rises, the second floor usually requires more cooling in the summer and less heating in the winter than the first floor. A non-zoned system cannot completely accommodate this seasonal variation. Zoning, however, can reduce the wide variations in temperature between floors by supplying heating or cooling only to the space that needs it.

A zoned system allows more control over the indoor environment because the occupants can decide which areas to heat or cool and when. With a zoned system, the occupants can program each specific zone to be active or inactive depending on their needs. For example, the occupants can set the bedrooms to be inactive during the day while the kitchen and living areas are active.

A properly zoned system can be up to 30 percent more efficient than a non-zoned system. A zoned system supplies warm or cool air only to those areas that require it. Thus, less energy is wasted heating and cooling spaces that are not being used.

In addition, a zoned system can sometimes allow the installation of smaller capacity equipment without compromising comfort. This reduces energy consumption by reducing wasted capacity.

Unfortunately, the equipment currently used in a zoned system is relatively expensive. Moreover, installing a zoned HVAC system, or retrofitting an existing system, is far beyond the capabilities of most homeowners. Unless the homeowner has specialized training, it is necessary to hire a specially-trained professional HVAC technician to configure and install the system. This makes zoned HVAC systems expensive to purchase and install. The cost of installation is such that even though the zoned system is more efficient, the payback period on such systems is many years. Such expense has severely limited the growth of zoned HVAC systems in the general home market.

SUMMARY

The system and method disclosed herein solves these and other problems by providing an Electronically-Controlled Register vent (ECRV) that can be easily installed by a homeowner or general handyman. The ECRV can be used to convert a non-zoned HVAC system into a zoned system. The ECRV can also be used in connection with a conventional zoned HVAC system to provide additional control and additional zones not provided by the conventional zoned HVAC system. In one embodiment, the ECRV is configured have a size and form-factor that conforms to a standard manually-controlled register vent. The ECRV can be installed in place of a conventional manually-controlled register vent—often without the use of tools.

In one embodiment, the ECRV is a self-contained zoned system unit that includes a register vent, a power supply, a thermostat, and a motor to open and close the register vent. To create a zoned HVAC system, the homeowner can simply remove the existing register vents in one or more rooms and replace the register vents with the ECRVs. The occupants can set the thermostat on the EVCR to control the temperature of the area or room containing the ECRV. In one embodiment, the ECRV includes a display that shows the programmed setpoint temperature. In one embodiment, the ECRV includes a display that shows the current setpoint temperature. In one embodiment, the ECRV includes a remote control interface to allow the occupants to control the ECRV by using a remote control. In one embodiment, the remote control includes a display that shows the programmed temperature and the current temperature. In one embodiment, the remote control shows the battery status of the ECRV.

In one embodiment, the EVCR includes a pressure sensor to measure the pressure of the air in the ventilation duct that supplies air to the EVCR. In one embodiment, the EVCR opens the register vent if the air pressure in the duct exceeds a specified value. In one embodiment, the pressure sensor is configured as a differential pressure sensor that measures the difference between the pressure in the duct and the pressure in the room.

In one embodiment, the ECRV is powered by an internal battery. A battery-low indicator on the ECRV informs the homeowner when the battery needs replacement. In one embodiment, one or more solar cells are provided to recharge the batteries when light is available. In one embodiment, the register vent include a fan to draw additional air from the supply duct in order to compensate for undersized vents or zones that need additional heating or cooling air.

In one embodiment, one or more ECRVs in a zone communicate with a zone thermostat. The zone thermostat measures the temperature of the zone for all of the ECRVs that control the zone. In one embodiment, the ECRVs and the zone thermostat communicate by wireless communication methods, such as, for example, infrared communication, radio-frequency communication, ultrasonic communication, etc. In one embodiment, the ECRVs and the zone thermostat communicate by direct wire connections. In one embodiment, the ECRVs and the zone thermostat communicate using power-line communication.

In one embodiment, one or more zone thermostats communicate with a central controller.

In one embodiment, the EVCR and/or the zoned thermostat includes an occupant sensor, such as, for example, an infrared sensor, motion sensor, ultrasonic sensor, etc. The occupants can program the EVCR or the zoned thermostat to bring the zone to different temperatures when the zone is occupied and when the zone is empty. In one embodiment, the occupants can program the EVCR or the zoned thermostat to bring the zone to different temperatures depending on the time of day, the time of year, the type of room (e.g. bedroom, kitchen, etc.), and/or whether the room is occupied or empty. In one embodiment, various EVCRs and/or zoned thermostats thought a composite zone (e.g., a group of zones such as an entire house, an entire floor, an entire wing, etc.) intercommunicate and change the temperature setpoints according to whether the composite zone is empty or occupied.

DETAILED DESCRIPTION

Figure 1:
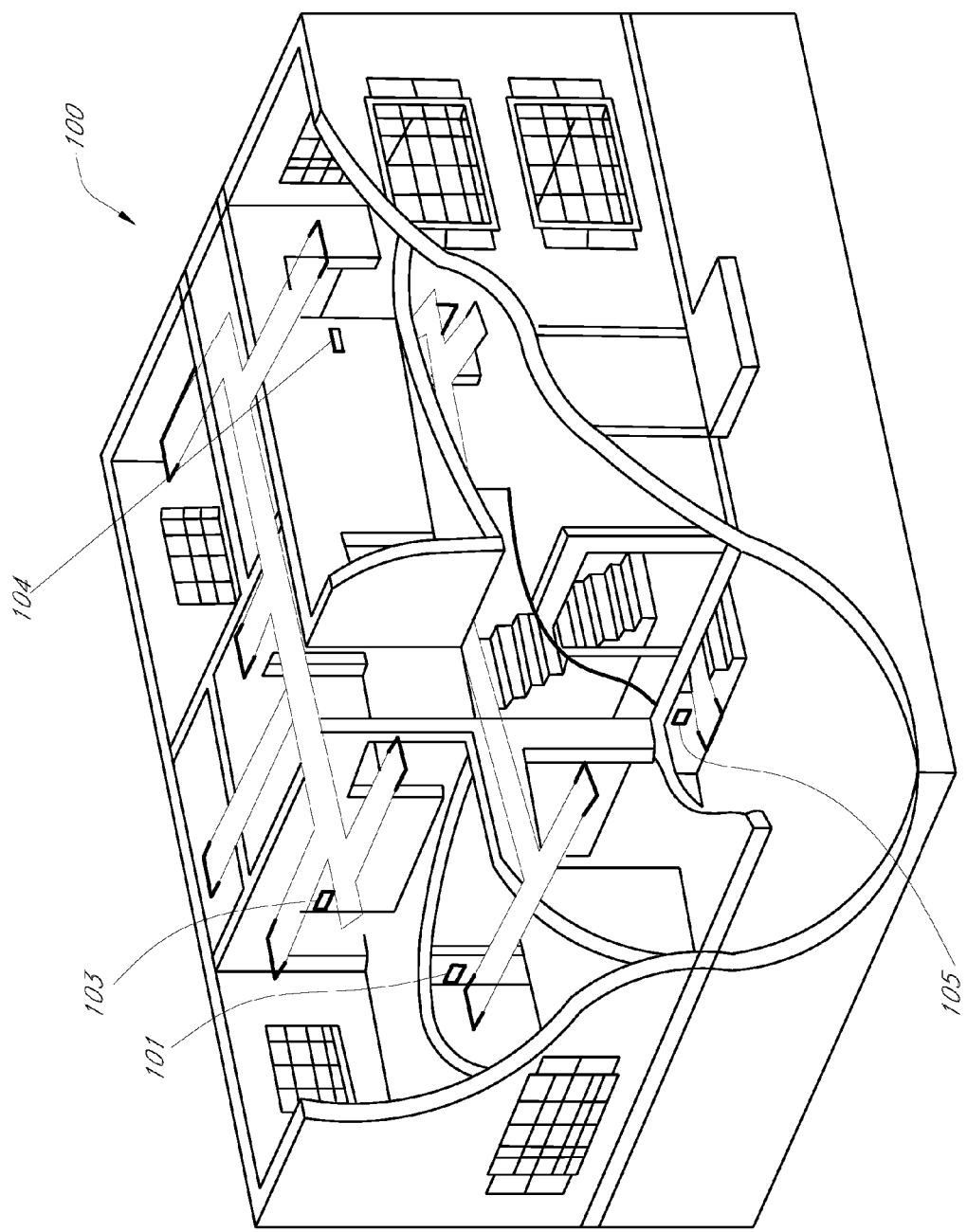
FIG. 1 shows a home with zoned heating and cooling.

FIG. 1 shows a home 100 with zoned heating and cooling. In the home 100, an HVAC system provides heating and cooling air to a system of ducts. Sensors 101-105 monitor the temperature in various areas (zones) of the house. A zone can be a room, a floor, a group of rooms, etc. The sensors 101-105 detect where and when heating or cooling air is needed. Information from the sensors 101-105 is used to control actuators that adjust the flow of air to the various zones. The zoned system adapts to changing conditions in one area without affecting other areas. For example, many two-story houses are zoned by floor. Because heat rises, the second floor usually requires more cooling in the summer and less heating in the winter than the first floor. A non-zoned system cannot completely accommodate this seasonal variation. Zoning, however, can reduce the wide variations in temperature between floors by supplying heating or cooling only to the space that needs it.

Figure 2:
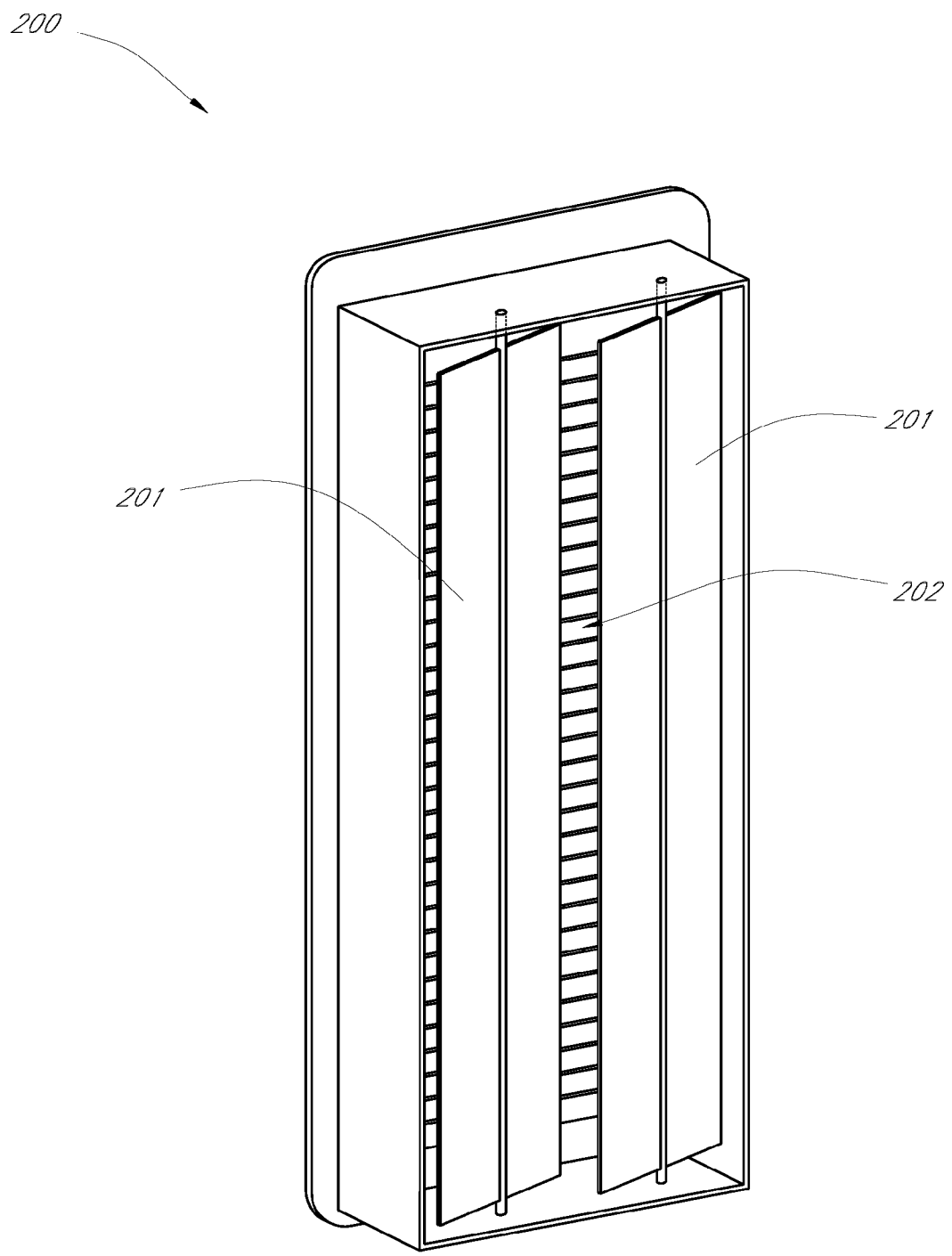
FIG. 2 shows one example of a conventional manually-controlled register vent.

FIG. 2 shows one example of a conventional manually-controlled register vent 200. The register 200 includes one or more vanes 201 that can be opened or closed to adjust the amount of air that flows through the register 200. Diverters 202 direct the air in a desired direction (or directions). The vanes 201 are typically provided to a mechanical mechanism so that the occupants can manipulate the vanes 201 to control the amount of air that flows out of the register 200. In some registers, the diverters 202 are fixed. In some registers, the diverters 202 are moveable to allow the occupants some control over the direction of the airflow out of the vent. Registers such as the register 200 are found throughout homes that have a central HVAC system that provides heating and cooling air. Typically, relatively small rooms such as bedrooms and bathrooms will have one or two such register vents of varying sizes. Larger rooms, such as living rooms, family rooms, etc., may have more than two such registers. The occupants of a home can control the flow of air through each of the vents by manually adjusting the vanes 201. When the register vent is located on the floor, or relatively low on the wall, such adjustment is usually not particularly difficult (unless the mechanism that controls the vanes 201 is bent or rusted). However, adjustment of the vanes 201 can be very difficult when the register vent 200 is located so high on the wall that it cannot be easily reached.

Figure 3:
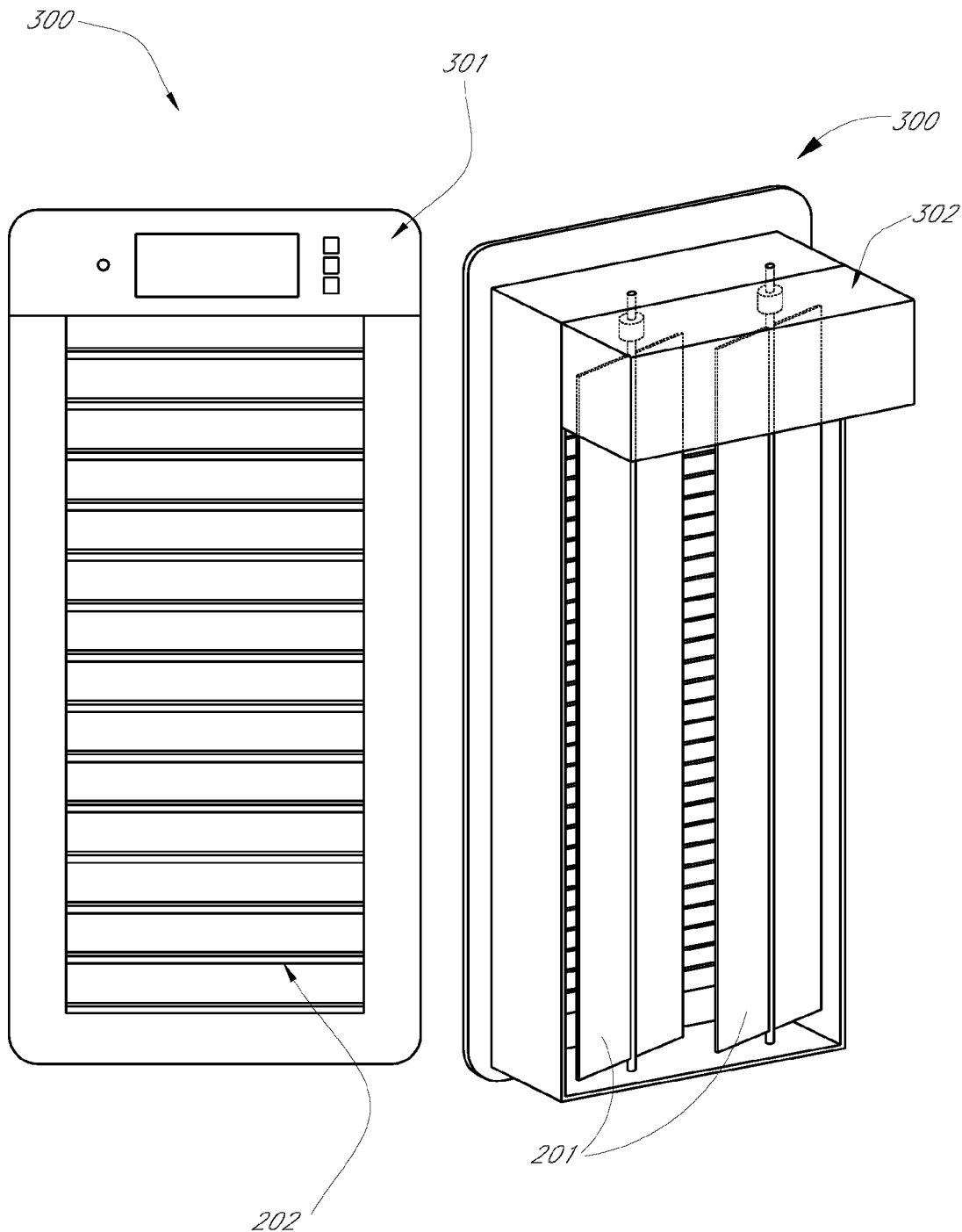
FIG. 3A is a front view of one embodiment of an electronically-controlled register vent.
FIG. 3B is a rear view of the electronically-controlled register vent shown in FIG. 3A.

FIG. 3 shows one embodiment of an Electronically-Controlled Register Vent (ECRV) 300. The ECRV 300 can be used to implement a zoned heating and cooling system. The ECRV 300 can also be used as a remotely control register vent in places where the vent is located so high on the wall that is cannot be easily reached. The ECRV 300 is configured as a replacement for the vent 200. This greatly simplifies the task of retrofitting a home by replacing one or more of the register vents 200 with the ECRVs 300. In one embodiment, shown in FIG. 3, the ECRV 300 is configured to fit into approximately the same size duct opening as the conventional register vent 200. In one embodiment, the ECRV 300 is configured to fit over the duct opening used by the conventional register vent 200. In one embodiment, the ECRV 300 is configured to fit over the conventional register 200, thereby allowing the register 200 to be left in place. A control panel 301 provides one or more visual displays and, optionally, one or more user controls. A housing 302 is provided to house an actuator to control the vanes 201. In one embodiment, the housing 302 can also be used to house electronics, batteries, etc.

Figure 4:
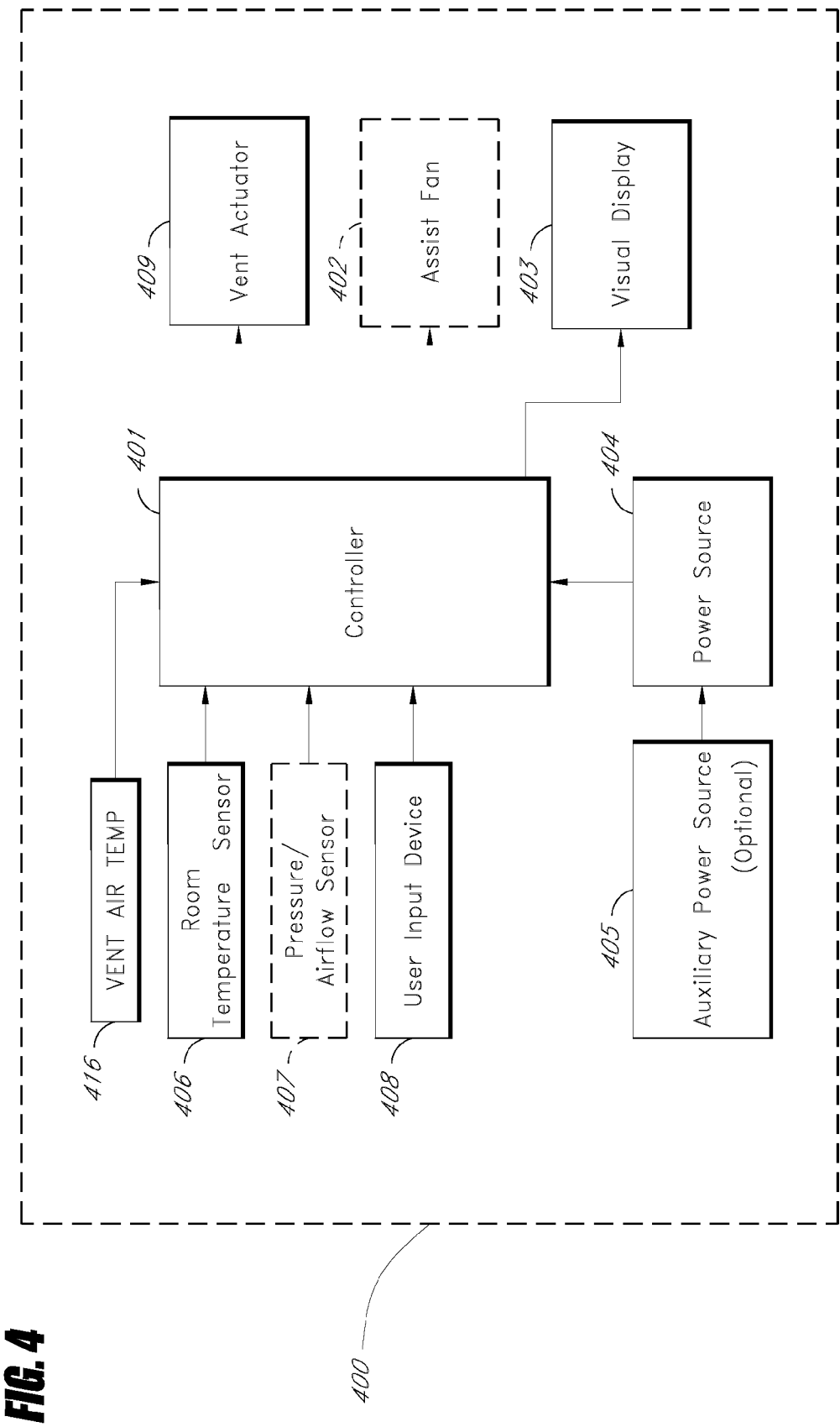
FIG. 4 is a block diagram of a self-contained ECRV.
Figure 18:
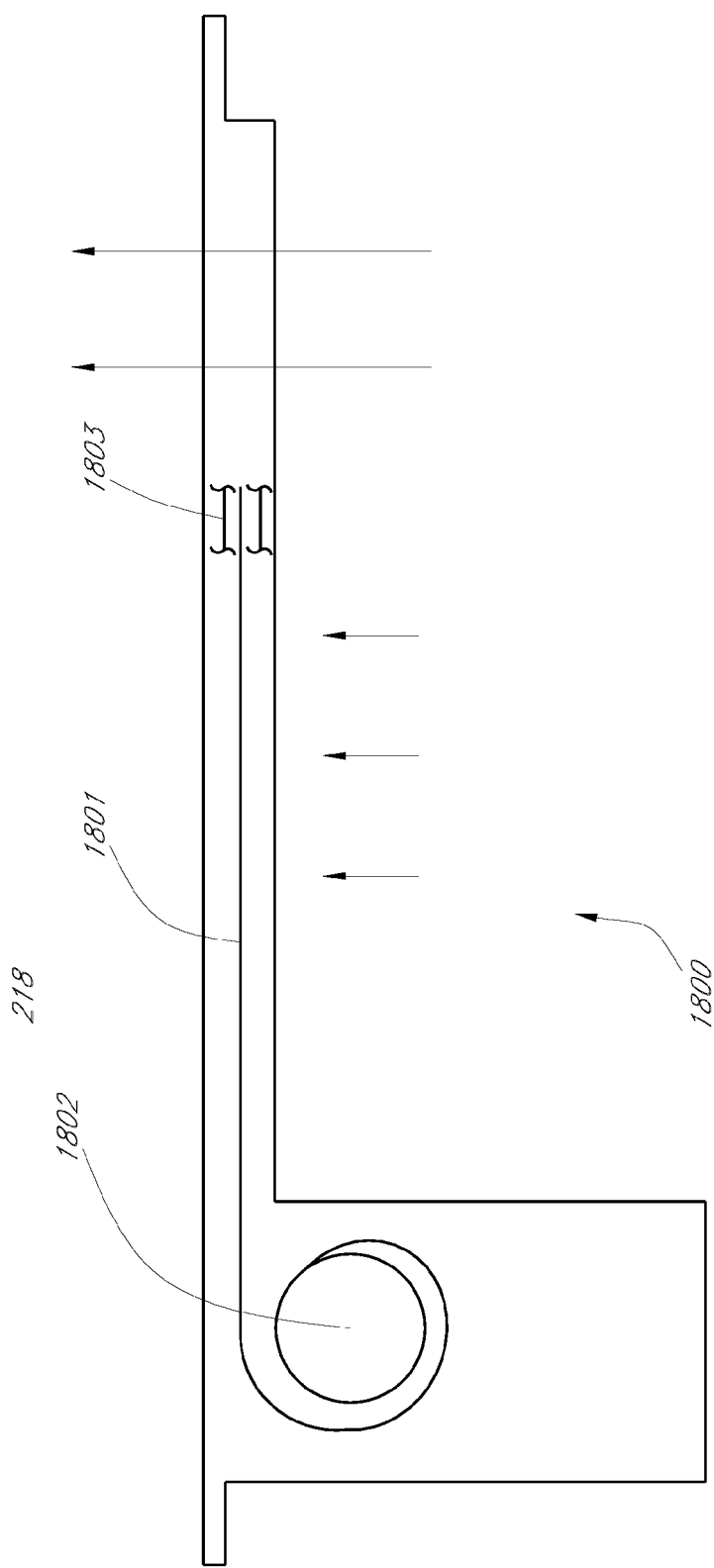
FIG. 18 shows an ECRV configured to use a scrolling curtain to control airflow as an alternative to the vanes shown in FIGS. 2 and 3.

FIG. 4 is a block diagram of a self-contained ECRV 400, which is one embodiment of the ECRV 300 shown in FIGS. 3A and 3B and the ECRV shown in FIG. 18. In the ECRV 400, a temperature sensor 406 and a temperature sensor 416 are provided to a controller 401. The controller 401 controls an actuator system 409. The actuator system 409 provided mechanical movements to control the airflow through the vent. In one embodiment, the actuator system 409 includes an actuator provided to the vanes 201 or other air-flow devices to control the amount of air that flows through the ECRV 400 (e.g., the amount of air that flows from the duct into the room). In one embodiment, an actuator system includes an actuator provided to one or more of the diverters 202 to control the direction of the airflow. The controller 401 also controls a visual display 403 and an optional fan 402. A user input device 408 is provided to allow the user to set the desired room temperature. An optional sensor 407 is provided to the controller 401. In one embodiment, the sensor 407 includes an air pressure and/or airflow sensor. In one embodiment, the sensor 407 includes a humidity sensor. A power source 404 provides power to the controller 401, the fan 402, the display 403, the temperature sensors 406, 416, the sensor 407, and the user input device 408 as needed. In one embodiment, the controller 401 controls the amount of power provided to the fan 402, the display 403, the sensor 406, the sensor 416, the sensor 407, and the user input device 408. In one embodiment, an optional auxiliary power source 405 is also provided to provide additional power. The auxiliary power source is a supplementary source of electrical power, such as, for example, a battery, a solar cell, an airflow (e.g., wind-powered) generator, the fan 402 acting as a generator, a nuclear-based electrical generator, a fuel cell, a thermocouple, etc.

In one embodiment, the power source 404 is based on a non-rechargeable battery and the auxiliary power source 405 includes a solar cell and a rechargeable battery. The controller 401 draws power from the auxiliary power source when possible to conserve power in the power source 404. When the auxiliary power source 405 is unable to provide sufficient power, then the controller 401 also draws power from the power source 404.

In an alternative embodiment, the power source 404 is configured as a rechargeable battery and the auxiliary power source 405 is configured as a solar cell that recharges the power source 404.

In one embodiment, the display 403 includes a flashing indicator (e.g., a flashing LED or LCD) when the available power from the power sources 404 and/or 405 drops below a threshold level.

The home occupants use the user input device 408 to set a desired temperature for the vicinity of the ECRV 400. The display 403 shows the setpoint temperature. In one embodiment, the display 403 also shows the current room temperature. The temperature sensor 406 measures the temperature of the air in the room, and the temperature sensor 416 measures the temperature of the air in the duct. If the room temperature is above the setpoint temperature, and the duct air temperature is below the room temperature, then the controller 401 causes the actuator 409 to open the vent. If the room temperature is below the setpoint temperature, and the duct air temperature is above the room temperature, then the controller 401 causes the actuator 409 to open the vent. Otherwise, the controller 401 causes the actuator 409 to close the vent. In other words, if the room temperature is above or below the setpoint temperature and the temperature of the air in the duct will tend to drive the room temperature towards the setpoint temperature, then the controller 401 opens the vent to allow air into the room. By contrast, if the room temperature is above or below the setpoint temperature and the temperature of the air in the duct will not tend to drive the room temperature towards the setpoint temperature, then the controller 401 closes the vent.

In one embodiment, the controller 401 is configured to provide a few degrees of hysteresis (often referred to as a thermostat deadband) around the setpoint temperature in order to avoid wasting power by excessive opening and closing of the vent.

In one embodiment, the controller 401 turns on the fan 402 to pull additional air from the duct. In one embodiment, the fan 402 is used when the room temperature is relatively far from the setpoint temperature in order to speed the movement of the room temperature towards the setpoint temperature. In one embodiment, the fan 402 is used when the room temperature is changing relatively slowly in response to the open vent. In one embodiment, the fan 402 is used when the room temperature is moving away from the setpoint and the vent is fully open. The controller 401 does not turn on or run the fan 402 unless there is sufficient power available from the power sources 404, 405. In one embodiment, the controller 401 measures the power level of the power sources 404, 405 before turning on the fan 402, and periodically (or continually) when the fan is on.

In one embodiment, the controller 401 also does not turn on the fan 402 unless it senses that there is airflow in the duct (indicating that the HVAC air-handler fan is blowing air into the duct). In one embodiment, the sensor 407 includes an airflow sensor. In one embodiment, the controller 401 uses the fan 402 as an airflow sensor by measuring (or sensing) voltage generated by the fan 402 rotating in response to air flowing from the duct through the fan and causing the fan to act as a generator. In one embodiment, the controller 401 periodically stop the fan and checks for airflow from the duct.

In one embodiment, the sensor 406 includes a pressure sensor configured to measure the air pressure in the duct. In one embodiment, the sensor 406 includes a differential pressure sensor configured to measure the pressure difference between the air in the duct and the air outside the ECRV (e.g., the air in the room). Excessive air pressure in the duct is an indication that too many vents may be closed (thereby creating too much back pressure in the duct and reducing airflow through the HVAC system). In one embodiment, the controller 401 opens the vent when excess pressure is sensed.

The controller 401 conserves power by turning off elements of the ECRV 400 that are not in use. The controller 401 monitors power available from the power sources 404, 405. When available power drops below a low-power threshold value, the controls the actuator 409 to an open position, activates a visual indicator using the display 403, and enters a low-power mode. In the low power mode, the controller 401 monitors the power sources 404, 405 but the controller does not provide zone control functions (e.g., the controller does not close the actuator 409). When the controller senses that sufficient power has been restored (e.g., through recharging of one or more of the power sources 404, 405, then the controller 401 resumes normal operation.

Figure 5:
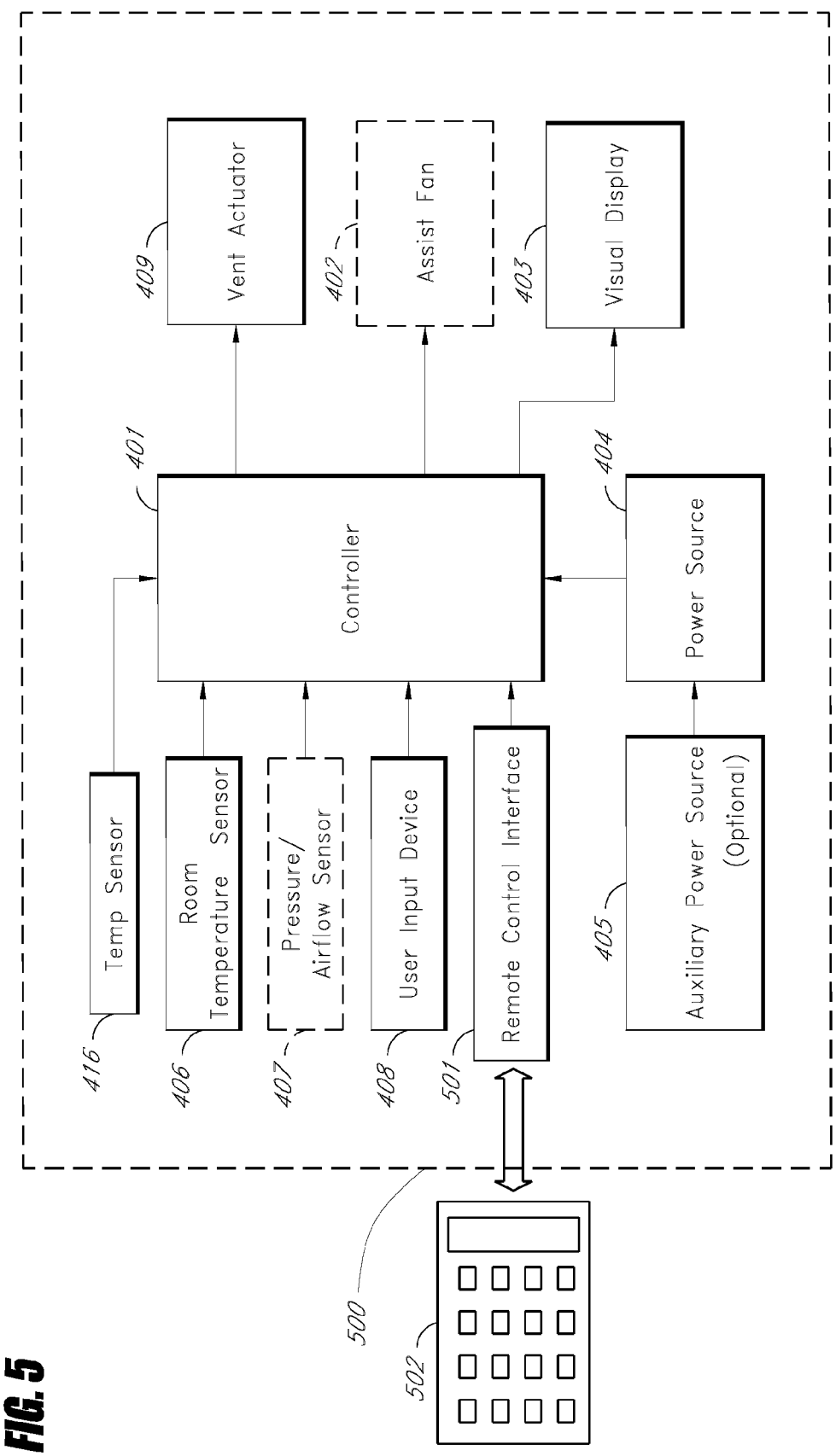
FIG. 5 is a block diagram of a self-contained ECRV with a remote control.

FIG. 5 is a block diagram of a self-contained ECRV 500 with a remote control interface 501. The ECRV 500 includes the power sources 404, 405, the controller 401, the fan 402, the display 403, the temperature sensors 406, 416, the sensor 407, and the user input device 408. The remote control interface 501 is provided to the controller 401, to allow the controller 401 to communicate with a remote control 502. The controller 502 sends wireless signals to the remote control interface 501 using wireless communication such as, for example, infrared communication, ultrasonic communication, and/or radio-frequency communication.

In one embodiment, the communication is one-way, from the remote control 502 to the controller 401. The remote control 502 can be used to set the temperature setpoint, to instruct the controller 401 to open or close the vent (either partially or fully), and/or to turn on the fan. In one embodiment, the communication between the remote control 502 and the controller 401 is two-way communication. Two-way communication allows the controller 401 to send information for display on the remote control 502, such as, for example, the current room temperature, the power status of the power sources 404, 405, diagnostic information, etc.

Figure 6:
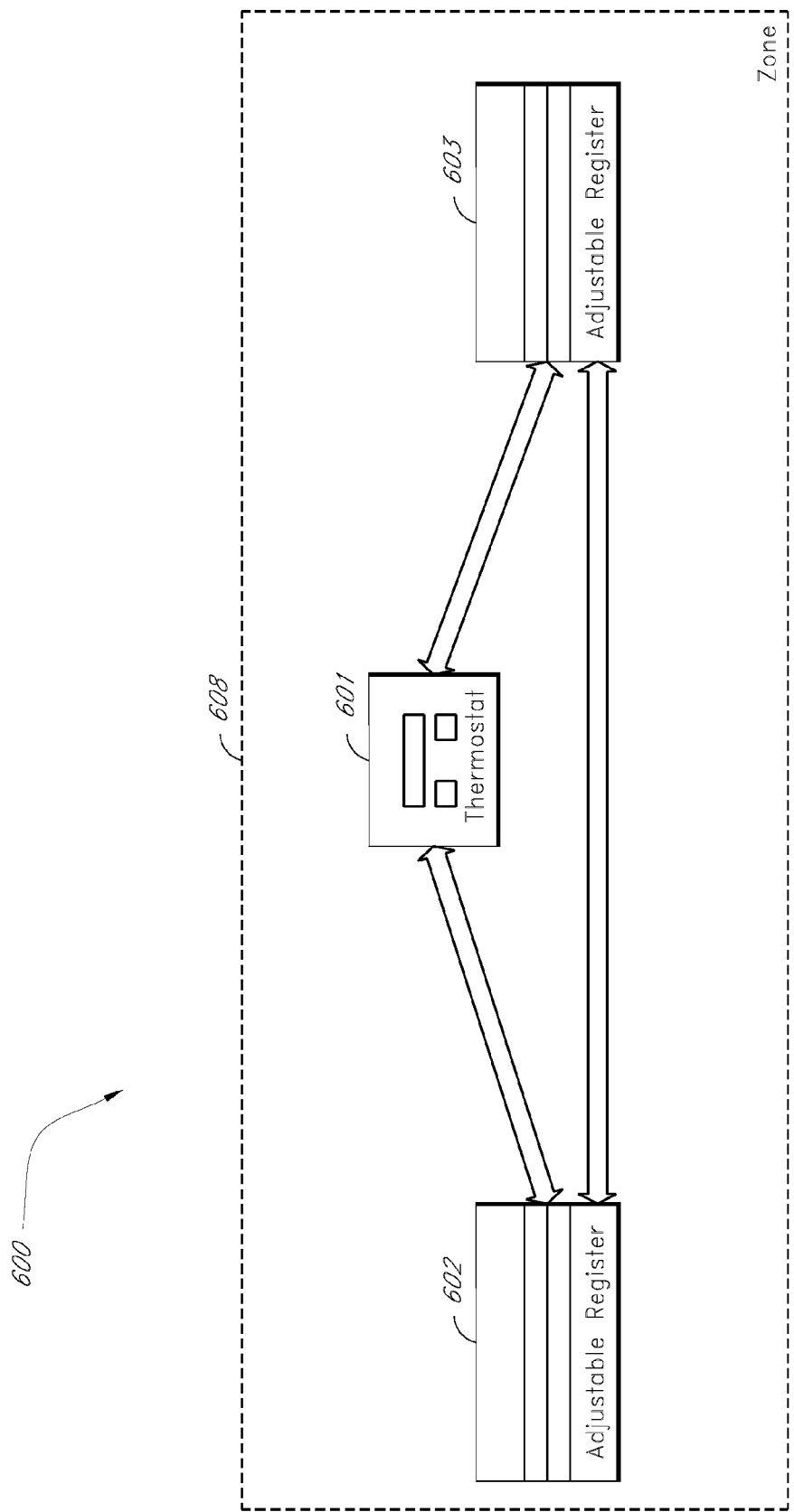
FIG. 6 is a block diagram of a locally-controlled zoned heating and cooling system wherein a zone thermostat controls one or more ECRVs.

The ECRV 400 described in connection with FIG. 4, and the ECRV 500 described in connection with FIG. 5 are configured to operate as self-contained devices in a relatively stand-alone mode. If two ECRVs 400, 500 are placed in the same room or zone, the ECRVs 400, 500 will not necessarily operate in unison. FIG. 6 is a block diagram of a locally-controlled zoned heating and cooling system 600 wherein a zone thermostat 601 monitors the temperature of a zone 608. ECRVs 602, 603 are configured to communicate with the zone thermostat 601. One embodiment of the ECRVs 620-603 is shown, for example, in connection with FIG. 10. In one embodiment, the zone thermostat 601 sends control commands to the ECRVs 602-603 to cause the ECRVs 602-603 to open or close. In one embodiment, the zone thermostat 601 sends temperature information to the ECRVs 602-603 and the ECRVs 602-603 determine whether to open or close based on the temperature information received from the zone thermostat 601. In one embodiment, the zone thermostat 601 sends information regarding the current zone temperature and the setpoint temperature to the ECRVs 602-603.

In one embodiment, the ECRV 602 communicates with the ECRV 603 in order to improve the robustness of the communication in the system 600. Thus, for example, if the ECRV 602 is unable to communicate with the zone thermostat 601 but is able to communicate with the ECRV 603, then the ECRV 603 can act as a router between the ECRV 602 and the zone thermostat 601. In one embodiment, the ECRV 602 and the ECRV 603 communicate to arbitrate opening and closing of their respective vents.

Figure 7A:
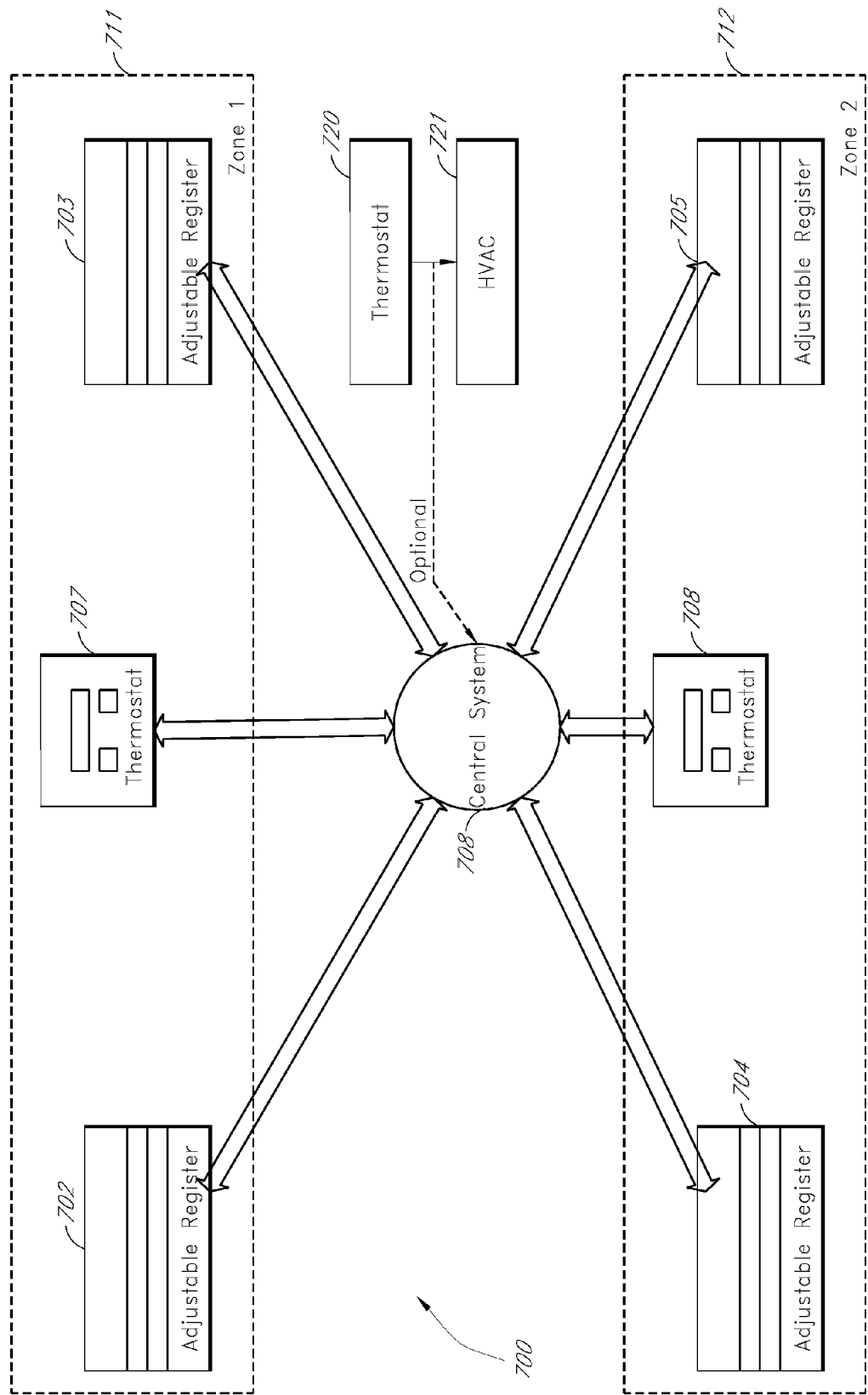
FIG. 7A is a block diagram of a centrally-controlled zoned heating and cooling system wherein the central control system communicates with one or more zone thermostats and one or more ECRVs independently of the HVAC system.

The system 600 shown in FIG. 6 provides local control of a zone 608. Any number of independent zones can be controlled by replicating the system 600. FIG. 7A is a block diagram of a centrally-controlled zoned heating and cooling system wherein a central control system 710 communicates with one or more zone thermostats 707 708 and one or more ECRVs 702-705. In the system 700, the zone thermostat 707 measures the temperature of a zone 711, and the ECRVs 702, 703 regulate air to the zone 711. The zone thermostat 708 measures the temperature of a zone 712, and the ECRVs 704, 705 regulate air to the zone 711. A central thermostat 720 controls the HVAC system 720.

Figure 7B:
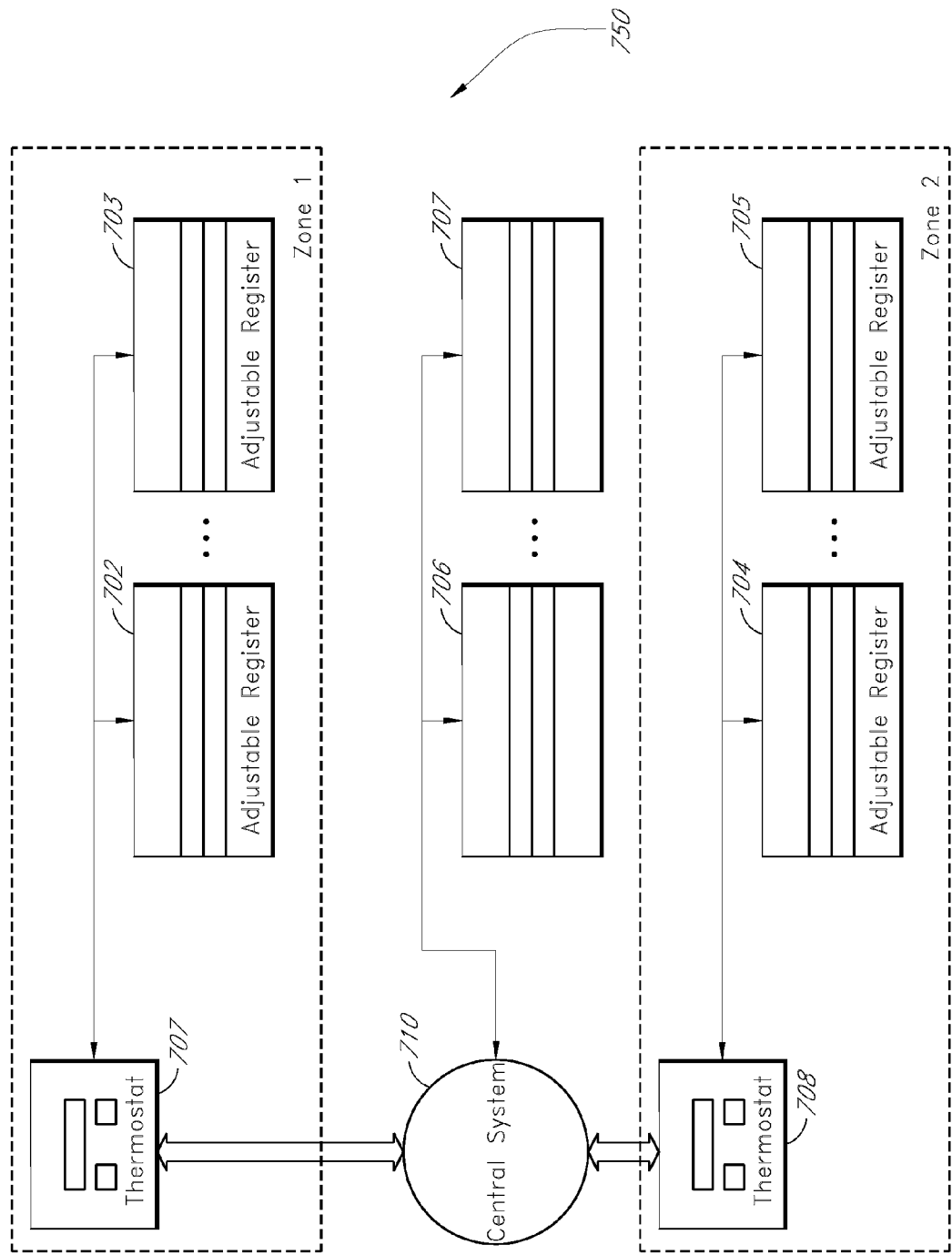
FIG. 7B is a block diagram of a centrally-controlled zoned heating and cooling system wherein the central control system communicates with one or more zone thermostats and the zone thermostats communicate with one or more ECRVs.

FIG. 7B is a block diagram of a centrally-controlled zoned heating and cooling system 750 that is similar to the system 700 shown in FIG. 7A. In FIG. 7B, the central system 710 communicates with the zone thermostats 707, 708, the zone thermostat 707 communicates with the ECRVs 702, 703, the zone thermostat 708 communicates with the ECRVs 704, 705, and the central system 710 communicates with the ECRVs 706, 707. In the system 750, the ECRVs 702-705 are in zones that are associated with the respective zone thermostat 707, 708 that controls the respective ECRVs 702-705. The ECRVs 706, 707 are not associated with any particular zone thermostat and are controlled directly by the central system 710. One of ordinary skill in the art will recognize that the communication topology shown in FIG. 7B can also be used in connection with the system shown in FIGS. 8 and 9.

The central system 710 controls and coordinates the operation of the zones 711 and 712, but the system 710 does not control the HVAC system 721. In one embodiment, the central system 710 operates independently of the thermostat 720. In one embodiment, the thermostat 720 is provided to the central system 710 so that the central system 710 knows when the thermostat is calling for heating, cooling, or fan.

The central system 710 coordinates and prioritizes the operation of the ECRVs 702-705. In one embodiment, the home occupants and provide a priority schedule for the zones 711, 712 based on whether the zones are occupied, the time of day, the time of year, etc. Thus, for example, if zone 711 corresponds to a bedroom and zone 712 corresponds to a living room, zone 711 can be given a relatively lower priority during the day and a relatively higher priority during the night. As a second example, if zone 711 corresponds to a first floor, and zone 712 corresponds to a second floor, then zone 712 can be given a higher priority in summer (since upper floors tend to be harder to cool) and a lower priority in winter (since lower floors tend to be harder to heat). In one embodiment, the occupants can specify a weighted priority between the various zones.

Closing too many vents at one time is often a problem for central HVAC systems as it reduces airflow through the HVAC system, and thus reduces efficiency. The central system 710 can coordinate how many vents are closed (or partially closed) and thus, ensure that enough vents are open to maintain proper airflow through the system. The central system 710 can also manage airflow through the home such that upper floors receive relatively more cooling air and lower floors receive relatively more heating air.

Figure 8:
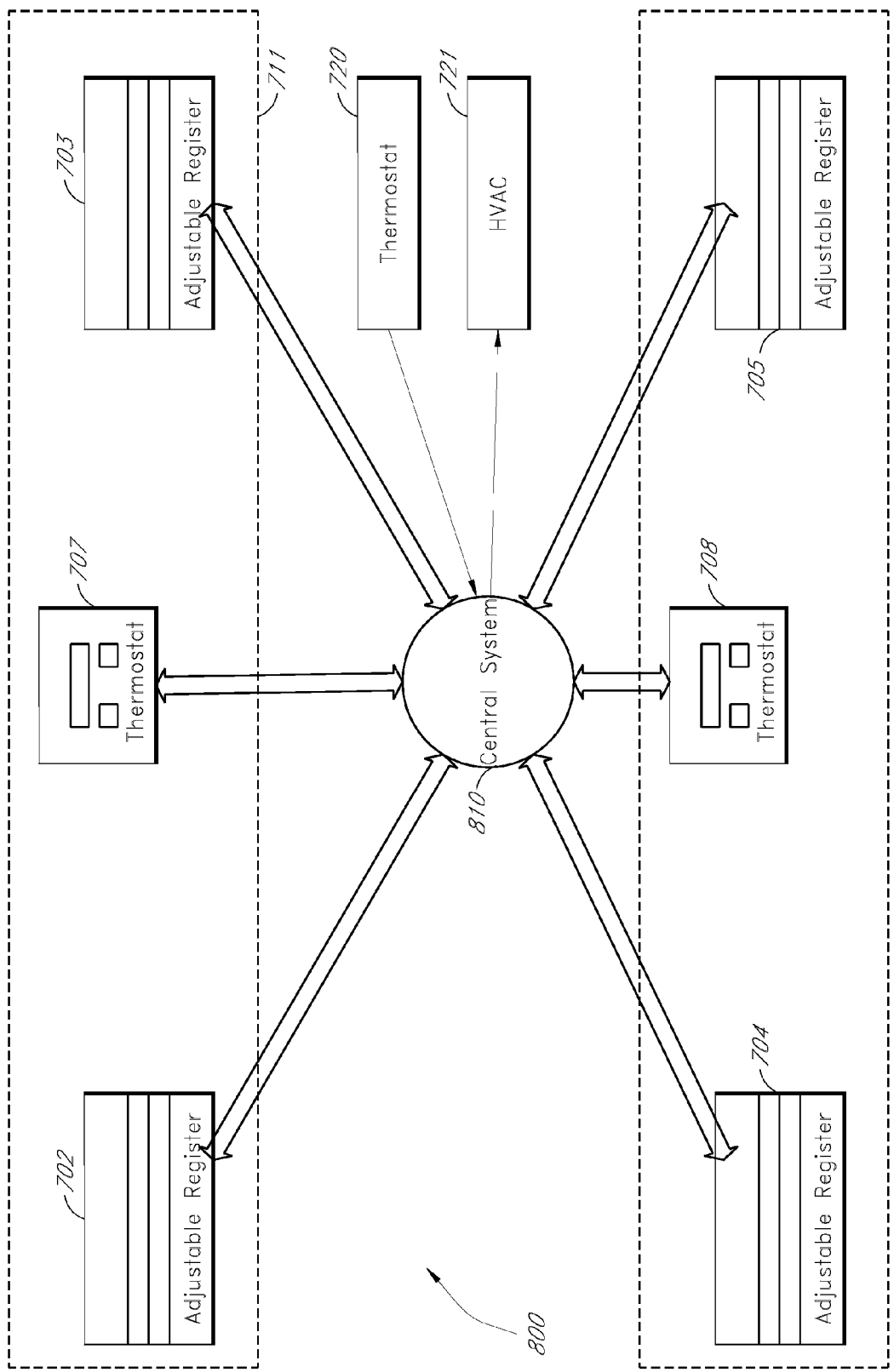
FIG. 8 is a block diagram of a centrally-controlled zoned heating and cooling system wherein a central control system communicates with one or more zone thermostats and one or more ECRVs and controls the HVAC system.

FIG. 8 is a block diagram of a centrally-controlled zoned heating and cooling system 800. The system 800 is similar to the system 700 and includes the zone thermostats 707, 708 to monitor the zones 711, 712, respectively, and the ECRVs 702-705. The zone thermostats 707, 708 and/or the ECRVs 702-705 communicate with a central controller 810. In the system 800, the thermostat 720 is provided to the central system 810 and the central system 810 controls the HVAC system 721 directly.

The controller 810 provides similar functionality as the controller 710. However, since the controller 810 also controls the operation of the HVAC system 721, the controller 810 is better able to call for heating and cooling as needed to maintain the desired temperature of the zones 711, 712. If all, or substantially, all of the home is served by the zone thermostats and ECRVs, then the central thermostat 720 can be eliminated.

In some circumstances, depending on the return air paths in the house, the controller 810 can turn on the HVAC fan (without heating or cooling) to move air from zones that are too hot to zones that are too cool (or vice versa) without calling for heating or cooling. The controller 810 can also provide for efficient use of the HVAC system by calling for heating and cooling as needed, and delivering the heating and cooling to the proper zones in the proper amounts. If the HVAC system 721 provides multiple operating modes (e.g., high-speed, low-speed, etc.), then the controller 810 can operate the HVAC system 721 in the most efficient mode that provides the amount of heating or cooling needed.

Figure 9:
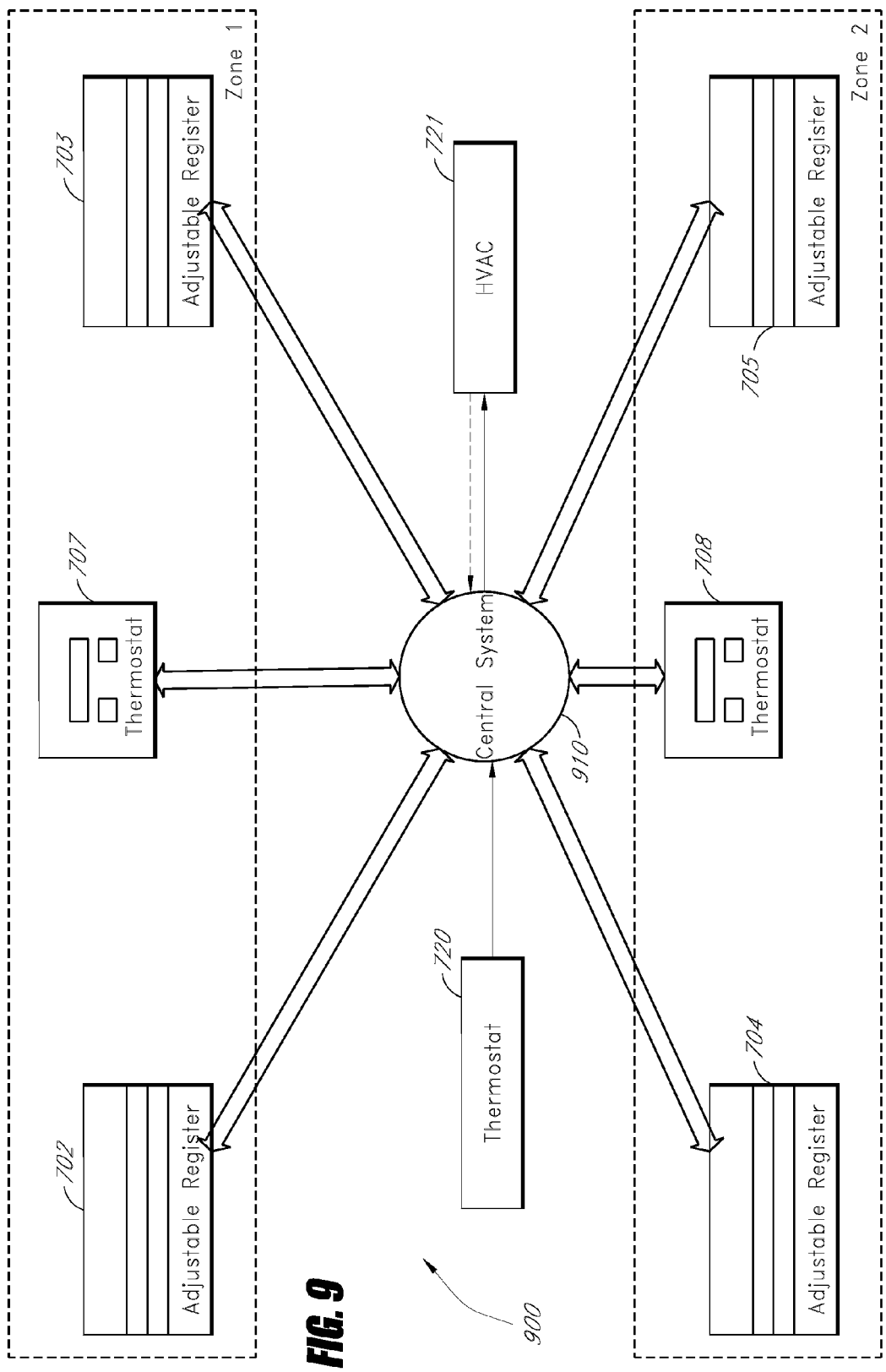
FIG. 9 is a block diagram of an efficiency-monitoring centrally-controlled zoned heating and cooling system wherein a central control system communicates with one or more zone thermostats and one or more ECRVs and controls and monitors the HVAC system.

FIG. 9 is a block diagram of an efficiency-monitoring centrally-controlled zoned heating and cooling system 900. The system 900 is similar to the system 800. In the system 900 the controller 810 is replaced by an efficiency-monitoring controller 910 that is configured to receive sensor data (e.g., system operating temperatures, etc.) from the HVAC system 721 to monitor the efficiency of the HVAC system 721.

Figure 10:
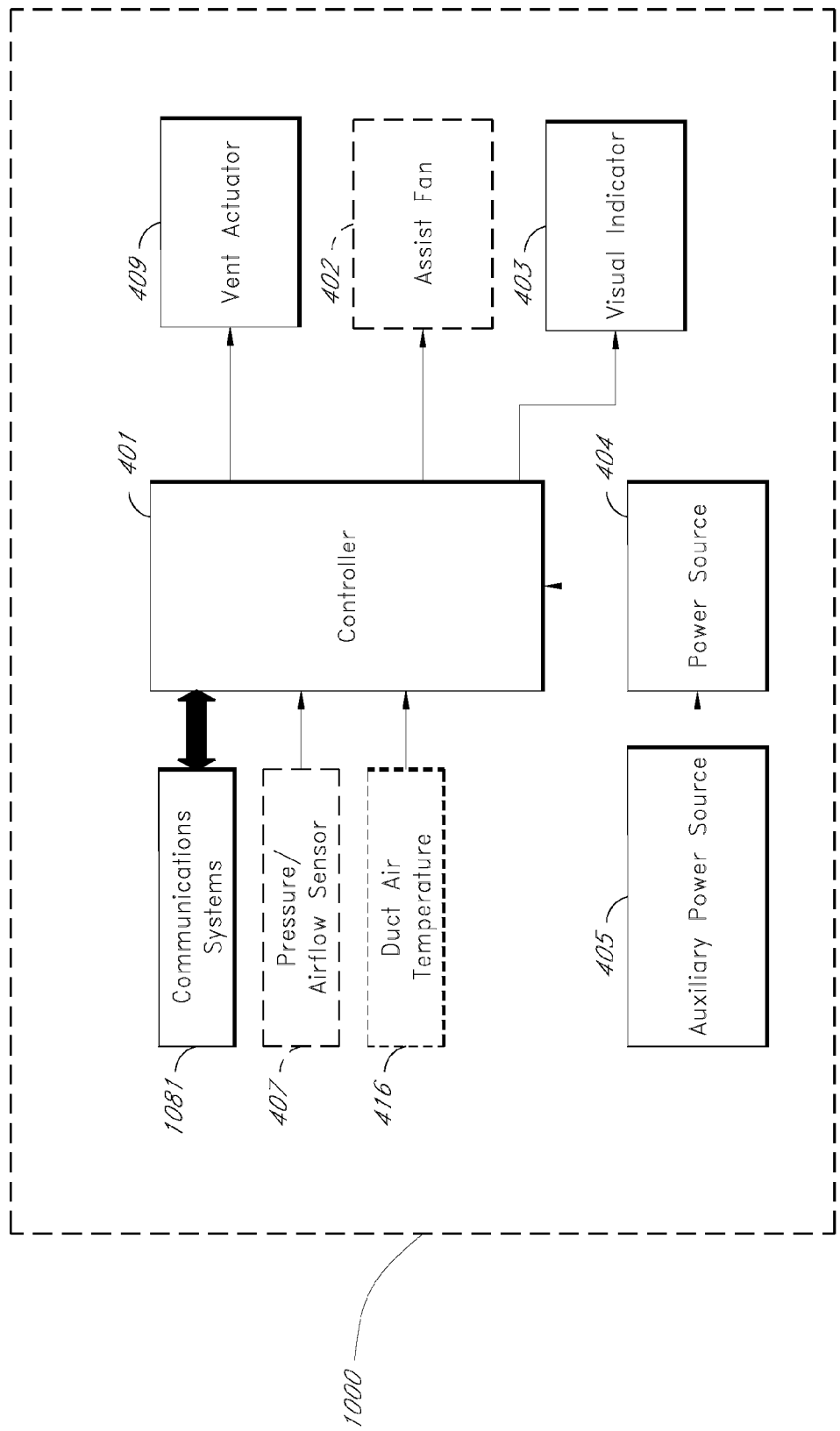
FIG. 10 is a block diagram of an ECRV for use in connection with the systems shown in FIGS. 6-9.

FIG. 10 is a block diagram of an ECRV 1000 for use in connection with the systems shown in FIGS. 6-9. The ECRV 1000 includes the power sources 404, 405, the controller 401, the fan 402, the display 403, and, optionally the temperature sensors 416 and the sensor 407, and the user input device 408. A communication system 1081 is provided to the controller 401. The remote control interface 501 is provided to the controller 401, to allow the controller 401 to communicate with a remote control 502. The controller 502 sends wireless signals to the remote control interface 501 using wireless communication such as, for example, infrared communication, ultrasonic communication, and/or radio-frequency communication.

The communication system 1081 is configured to communicate with the zone thermometer and, optionally, with the central controllers 710, 810, 910. In one embodiment, the communication system 1081 is configured to communicate using wireless communication such as, for example, infrared communication, radio communication, or ultrasonic communication.

Figure 11:
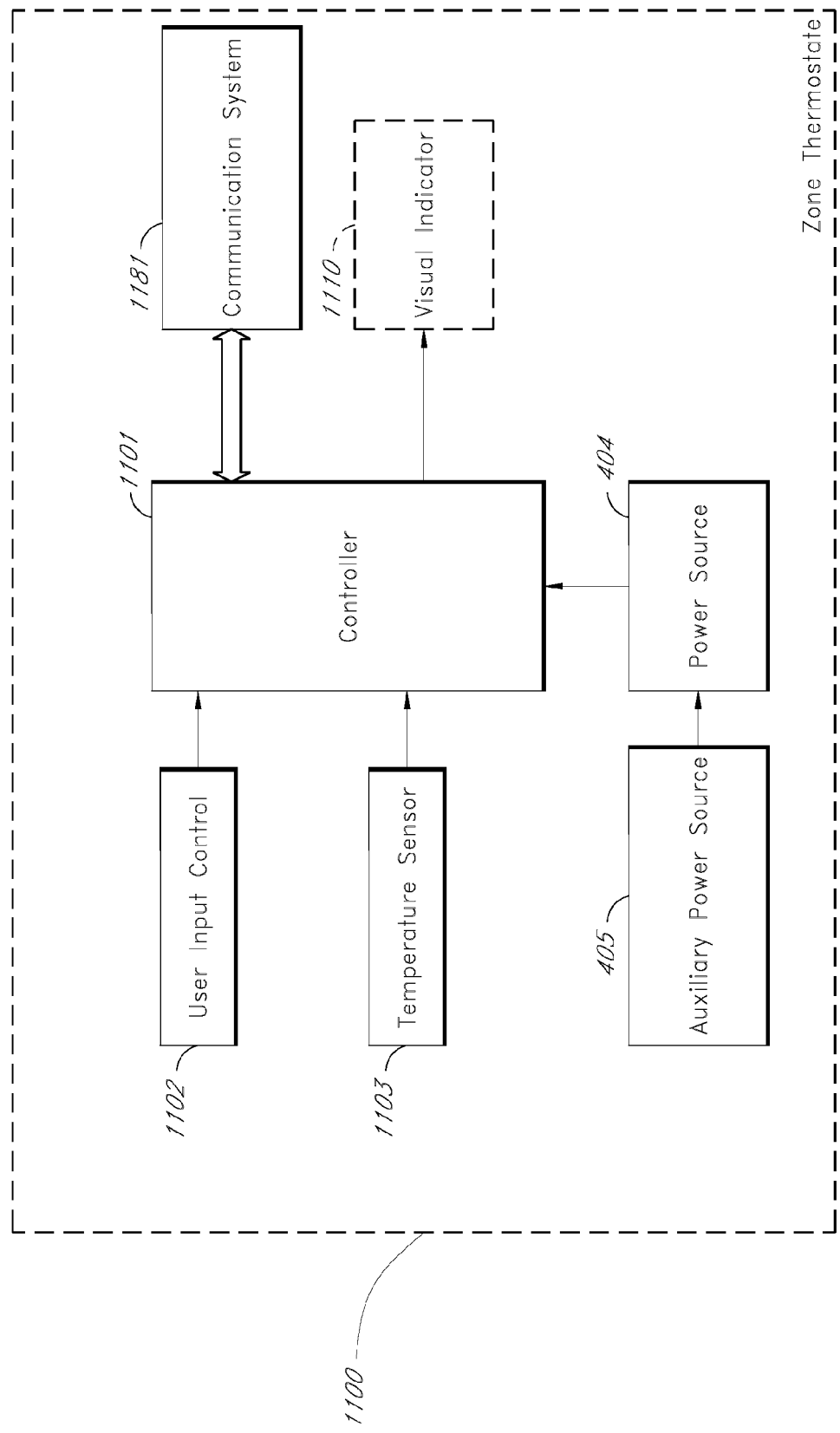
FIG. 11 is a block diagram of a basic zone thermostat for use in connection with the systems shown in FIGS. 6-9.

FIG. 11 is a block diagram of a basic zone thermostat 1100 for use in connection with the systems shown in FIGS. 6-9. In the zone thermostat 1100, a temperature sensor 1102 is provided to a controller 1101. User input controls 1103 are also provided to the controller 1101 to allow the user to specify a setpoint temperature. A visual display 1110 is provided to the controller 1101. The controller 1101 uses the visual display 1110 to show the current temperature, setpoint temperature, power status, etc. The communication system 1181 is also provided to the controller 1101. The power source 404 and, optionally, 405 are provided to provide power for the controller 1100, the controls 1101, the sensor 1103, the communication system 1181, and the visual display 1110.

In systems where a central controller 710, 810, 910 is used, the communication method used by the zone thermostat 1100 to communicate with the ECRV 1000 need not be the same method used by the zone thermostat 1100 to communicate with the central controller 710, 810, 910. Thus, in one embodiment, the communication system 1181 is configured to provide one type of communication (e.g., infrared, radio, ultrasonic) with the central controller, and a different type of communication with the ECRV 1000.

In one embodiment, the zone thermostat is battery powered. In one embodiment, the zone thermostat is configured into a standard light switch and receives electrical power from the light switch circuit.

Figure 12:
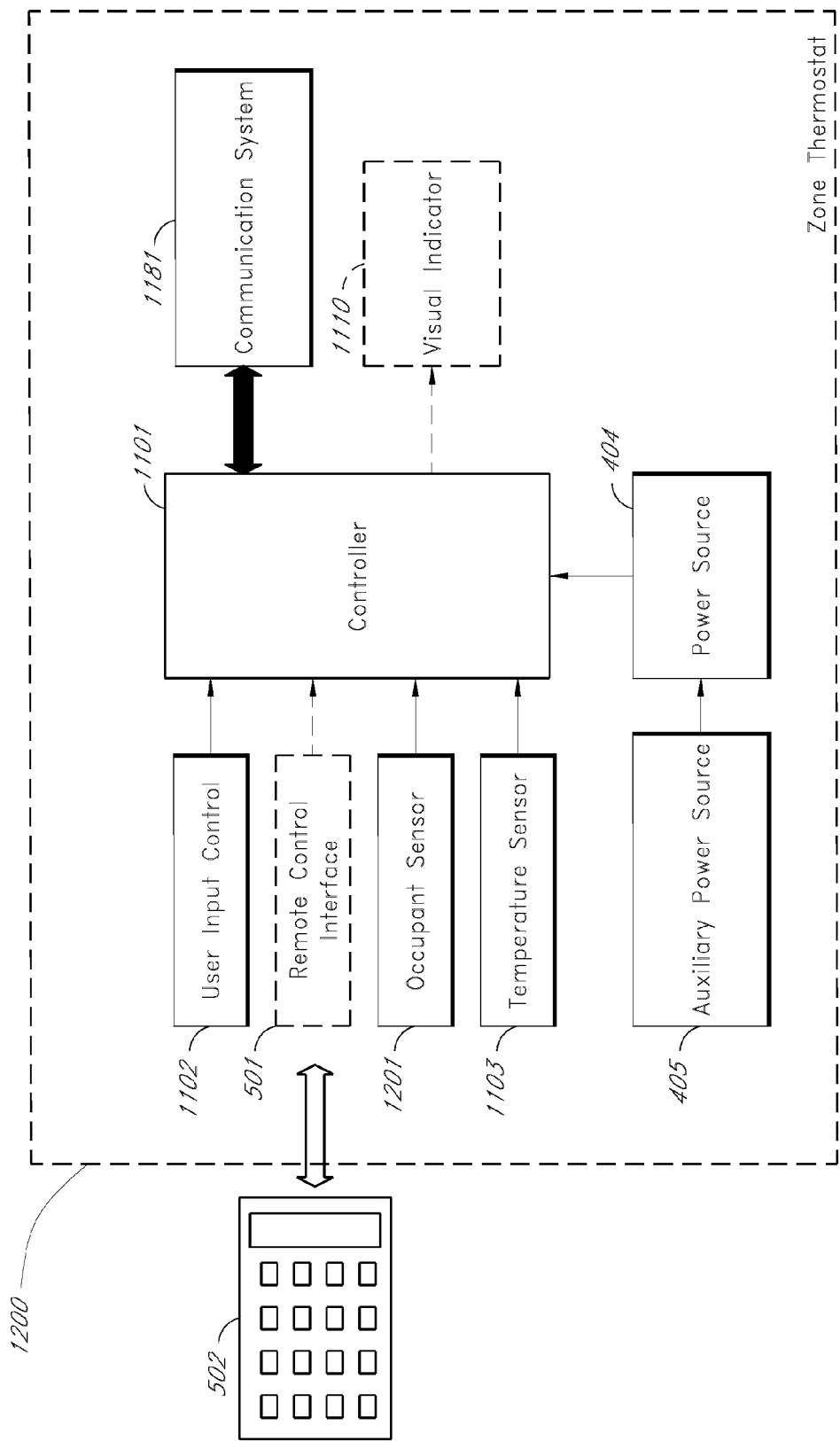
FIG. 12 is a block diagram of a zone thermostat with remote control for use in connection with the systems shown in FIGS. 6-9.

FIG. 12 is a block diagram of a zone thermostat 1200 with remote control for use in connection with the systems shown in FIGS. 6-9. The thermostat 1200 is similar to the thermostat 1100 and includes, the temperature sensor 1102, the input controls 1103, the visual display 1110, the communication system 1181, and the power sources 404, 405. In the zone thermostat 1200, the remote control interface 501 is provided to the controller 1101.

In one embodiment, an occupant sensor 1201 is provided to the controller 1101. The occupant sensor 1201, such as, for example, an infrared sensor, motion sensor, ultrasonic sensor, etc. senses when the zone is occupied. The occupants can program the zone thermostat 1201 to bring the zone to different temperatures when the zone is occupied and when the zone is empty. In one embodiment, the occupants can program the zoned thermostat 1201 to bring the zone to different temperatures depending on the time of day, the time of year, the type of room (e.g. bedroom, kitchen, etc.), and/or whether the room is occupied or empty. In one embodiment, a group of zones are combined into a composite zone (e.g., a group of zones such as an entire house, an entire floor, an entire wing, etc.) and the central system 710, 810, 910 changes the temperature setpoints of the various zones according to whether the composite zone is empty or occupied.

Figure 13:
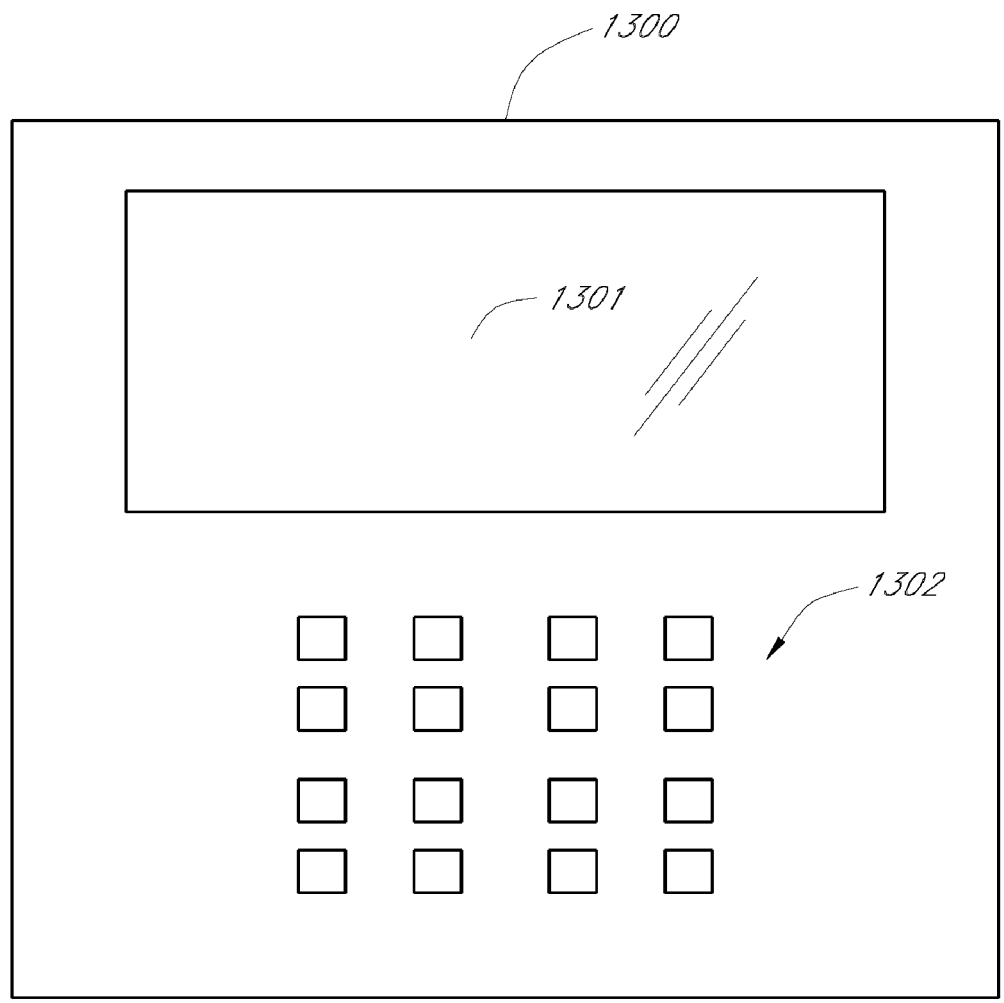
FIG. 13 shows one embodiment of a central monitoring system.

FIG. 13 shows one embodiment of a central monitoring station console 1300 for accessing the functions represented by the blocks 710, 810, 910 in FIGS. 7, 8, 9, respectively. The station 1300 includes a display 1301 and a keypad 1302. The occupants can specify zone temperature settings, priorities, and thermostat deadbands using the central system 1300 and/or the zone thermostats. In one embodiment, the console 1300 is implemented as a hardware device. In one embodiment, the console 1300 is implemented in software as a computer display, such as, for example, on a personal computer. In one embodiment, the zone control functions of the blocks 710, 810, 910 are provided by a computer program running on a control system processor, and the control system processor interfaces with personal computer to provide the console 1300 on the personal computer. In one embodiment, the zone control functions of the blocks 710, 810, 910 are provided by a computer program running on a control system processor provided to a hardware console 1300. In one embodiment, the occupants can use the Internet, telephone, cellular telephone, pager, etc. to remotely access the central system to control the temperature, priority, etc. of one or more zones.

Figure 14:
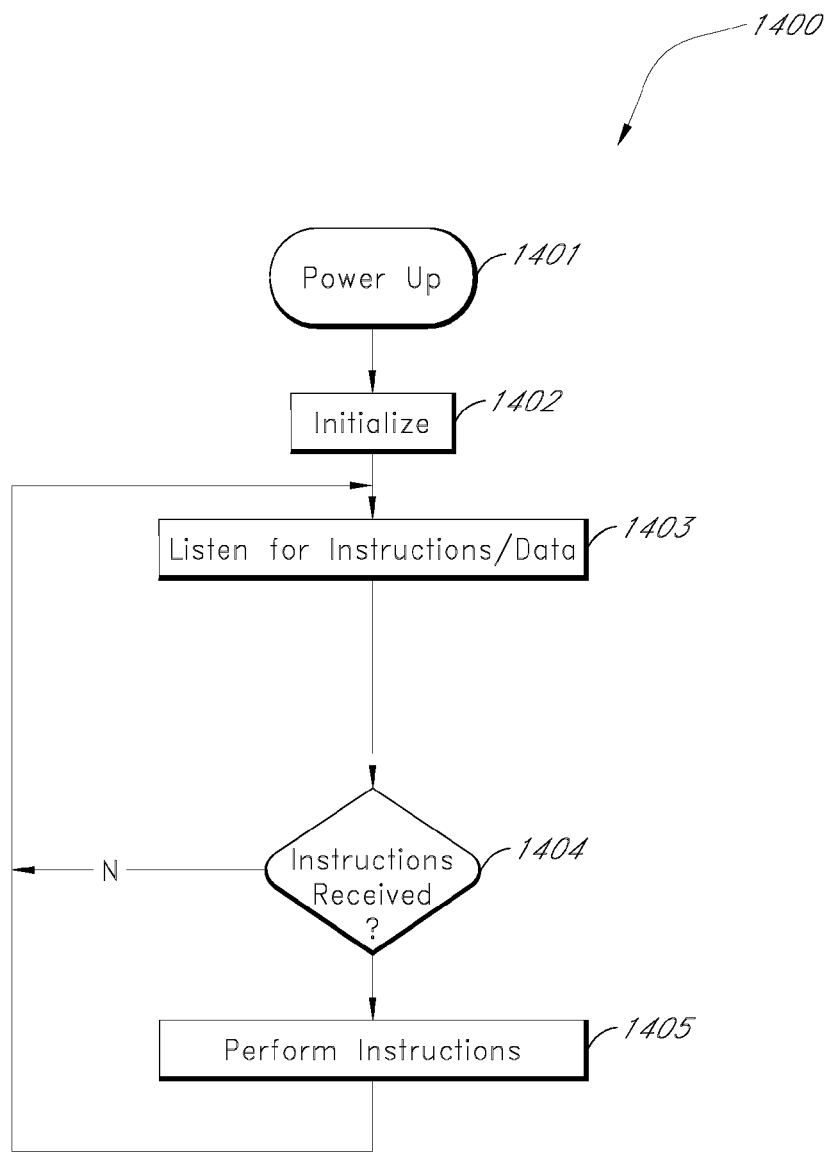
FIG. 14 is a flowchart showing one embodiment of an instruction loop for an ECRV or zone thermostat.

FIG. 14 is a flowchart showing one embodiment of an instruction loop process 1400 for an ECRV or zone thermostat. The process 1400 begins at a power-up block 1401. After power up, the process proceeds to an initialization block 1402. After initialization, the process advances to a "listen" block 1403 wherein the ECRV or zone thermostat listens for one or more instructions. If a decision block 1404 determines that an instruction has been received, then the process advances to a "perform instruction" block 1405, otherwise the process returns to the listen block 1403.

For an ECRV, the instructions can include: open vent, close vent, open vent to a specified partially-open position, report sensor data (e.g., airflow, temperature, etc.), report status (e.g, battery status, vent position, etc.), and the like. For a zone thermostat, the instructions can include: report temperature sensor data, report temperature rate of change, report setpoint, report status, etc. In systems where the central system communicates with the ECRVs through a zone thermostat, the instructions can also include: report number of ECRVs, report ECRV data (e.g., temperature, airflow, etc.), report ECRV vent position, change ECRV vent position, etc.

In one embodiment, the listen block 1403 consumes relatively little power, thereby allowing the ECRV or zone thermostat to stay in the loop corresponding to the listen block 1403 and conditional branch 1404 for extended periods of time.

Figure 15:
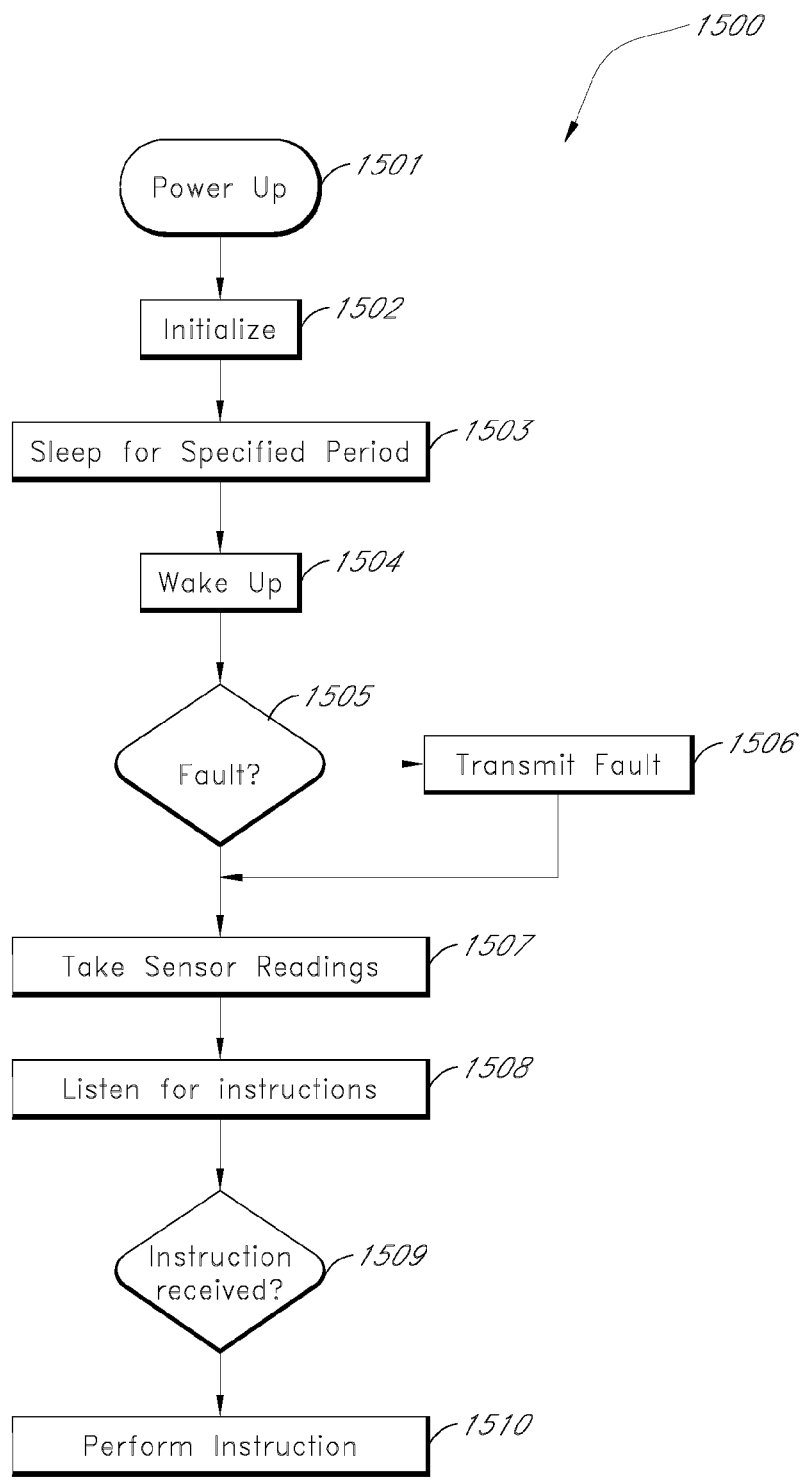
FIG. 15 is a flowchart showing one embodiment of an instruction and sensor data loop for an ECRV or zone thermostat.

Although the listen block 1403 can be implemented to use relatively little power, a sleep block can be implemented to use even less power. FIG. 15 is a flowchart showing one embodiment of an instruction and sensor data loop process 1500 for an ECRV or zone thermostat. The process 1500 begins at a power-up block 1501. After power up, the process proceeds to an initialization block 1502. After initialization, the process advances to a "sleep" block 1503 wherein the ECRV or zone thermostat sleeps for a specified period of time. When the sleep period expires, the process advances to a wakeup block 1504 and then to a decision 1505. In the decision block 1505, if a fault is detected, then a transmit fault block 1506 is executed. The process then advances to a sensor block 1507 where sensor readings are taken. After taking sensor readings, the process advances to a listen-for-instructions block 1508. If an instruction has been received, then the process advances to a "perform instruction" block 1510; otherwise, the process returns to the sleep block 1503.

Figure 16:
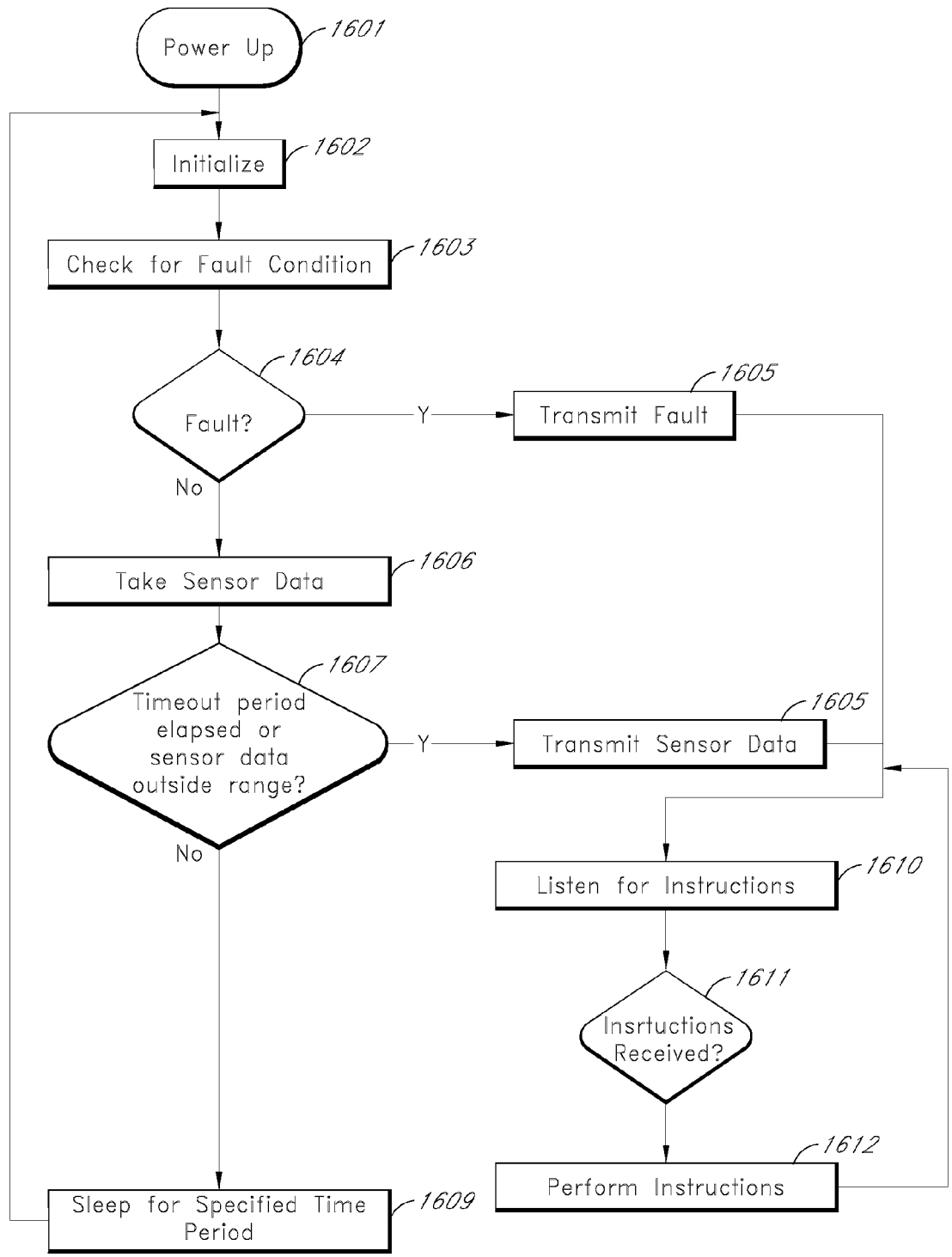
FIG. 16 is a flowchart showing one embodiment of an instruction and sensor data reporting loop for an ECRV or zone thermostat.

FIG. 16 is a flowchart showing one embodiment of an instruction and sensor data reporting loop process 1600 for an ECRV or zone thermostat. The process 1600 begins at a power-up block 1601. After power up, the process proceeds to an initialization block 1602. After initialization, the process advances to a check fault block 1603. If a fault is detected then a decision block 1604 advances the process to a transmit fault block 1605; otherwise, the process advances to a sensor block 1606 where sensor readings are taken. The data values from one or more sensors are evaluated, and if the sensor data is outside a specified range, or if a timeout period has occurred, then the process advances to a transmit data block 1608; otherwise, the process advances to a sleep block 1609. After transmitting in the transmit fault block 1605 or the transmit sensor data block 1608, the process advances to a listen block 1610 where the ECRV or zone thermostat listens for instructions. If an instruction is received, then a decision block advances the process to a perform instruction block 1612; otherwise, the process advances to the sleep block 1609. After executing the perform instruction block 1612, the process transmits an "instruction complete message" and returns to the listen block 1610.

The process flows shown in FIGS. 14-16 show different levels of interaction between devices and different levels of power conservation in the ECRV and/or zone thermostat. One of ordinary skill in the art will recognize that the ECRV and zone thermostat are configured to receive sensor data and user inputs, report the sensor data and user inputs to other devices in the zone control system, and respond to instructions from other devices in the zone control system. Thus the process flows shown in FIGS. 14-16 are provided for illustrative purposes and not by way of limitation. Other data reporting and instruction processing loops will be apparent to those of ordinary skill in the art by using the disclosure herein.

In one embodiment, the ECRV and/or zone thermostat "sleep," between sensor readings. In one embodiment, the central system 710 sends out a "wake up" signal. When an ECRV or zone thermostat receives a wake up signal, it takes one or more sensor readings, encodes it into a digital signal, and transmits the sensor data along with an identification code.

In one embodiment, the ECRV is bi-directional and configured to receive instructions from the central system. Thus, for example, the central system can instruct the ECRV to: perform additional measurements; go to a standby mode; wake up; report battery status; change wake-up interval; run self-diagnostics and report results; etc.

In one embodiment, the ECRV provides two wake-up modes, a first wake-up mode for taking measurements (and reporting such measurements if deemed necessary), and a second wake-up mode for listening for commands from the central system. The two wake-up modes, or combinations thereof, can occur at different intervals.

In one embodiment, the ECRVs use spread-spectrum techniques to communicate with the zone thermostats and/or the central system. In one embodiment, the ECRVs use frequency-hopping spread-spectrum. In one embodiment, each ECRV has an Identification code (ID) and the ECRVs attaches its ID to outgoing communication packets. In one embodiment, when receiving wireless data, each ECRV ignores data that is addressed to other ECRVs.

In one embodiment, the ECRV provides bi-directional communication and is configured to receive data and/or instructions from the central system. Thus, for example, the central system can instruct the ECRV to perform additional measurements, to go to a standby mode, to wake up, to report battery status, to change wake-up interval, to run self-diagnostics and report results, etc. In one embodiment, the ECRV reports its general health and status on a regular basis (e.g., results of self-diagnostics, battery health, etc.)

In one embodiment, the ECRV use spread-spectrum techniques to communicate with the central system. In one embodiment, the ECRV uses frequency-hopping spread-spectrum. In one embodiment, the ECRV has an address or identification (ID) code that distinguishes the ECRV from the other ECRVs. The ECRV attaches its ID to outgoing communication packets so that transmissions from the ECRV can be identified by the central system. The central system attaches the ID of the ECRV to data and/or instructions that are transmitted to the ECRV. In one embodiment, the ECRV ignores data and/or instructions that are addressed to other ECRVs.

In one embodiment, the ECRVs, zone thermostats, central system, etc., communicate on a 900 MHz frequency band. This band provides relatively good transmission through walls and other obstacles normally found in and around a building structure. In one embodiment, the ECRVs and zone thermostats communicate with the central system on bands above and/or below the 900 MHz band. In one embodiment, the ECRVs and zone thermostats listen to a radio frequency channel before transmitting on that channel or before beginning transmission. If the channel is in use, (e.g., by another device such as another central system, a cordless telephone, etc.) then the ECRVs and/or zone thermostats change to a different channel. In one embodiment, the sensor, central system coordinates frequency hopping by listening to radio frequency channels for interference and using an algorithm to select a next channel for transmission that avoids the interference. In one embodiment, the ECRV and/or zone thermostat transmits data until it receives an acknowledgement from the central system that the message has been received.

Frequency-hopping wireless systems offer the advantage of avoiding other interfering signals and avoiding collisions. Moreover, there are regulatory advantages given to systems that do not transmit continuously at one frequency. Channel-hopping transmitters change frequencies after a period of continuous transmission, or when interference is encountered. These systems may have higher transmit power and relaxed limitations on in-band spurs.

In one embodiment, the controller 401 reads the sensors 406, 407, 416 at regular periodic intervals. In one embodiment, the controller 401 reads the sensors 406, 407, 416 at random intervals. In one embodiment, the controller 401 reads the sensors 406, 407, 416 in response to a wake-up signal from the central system. In one embodiment, the controller 401 sleeps between sensor readings.

In one embodiment, the ECRV transmits sensor data until a handshaking-type acknowledgement is received. Thus, rather than sleep if no instructions or acknowledgements are received after transmission (e.g., after the instruction block 1510, 1405, 1612 and/or the transmit blocks 1605, 1608) the ECRV retransmits its data and waits for an acknowledgement. The ECRV continues to transmit data and wait for an acknowledgement until an acknowledgement is received. In one embodiment, the ECRV accepts an acknowledgement from a zone thermometer and it then becomes the responsibility of the zone thermometer to make sure that the data is forwarded to the central system. The two-way communication ability of the ECRV and zone thermometer provides the capability for the central system to control the operation of the ECRV and/or zone thermometer and also provides the capability for robust handshaking-type communication between the ECRV, the zone thermometer, and the central system.

In one embodiment of the system 600 shown in FIG. 6, the ECRVs 602, 603 send duct temperature data to the zone thermostat 601. The zone thermostat 601 compares the duct temperature to the room temperature and the setpoint temperature and makes a determination as to whether the ECRVs 602, 603 should be open or closed. The zone thermostat 601 then sends commands to the ECRVs 602, 603 to open or close the vents. In one embodiment, the zone thermostat 601 displays the vent position on the visual display 1110.

In one embodiment of the system 600 shown in FIG. 6, the zone thermostat 601 sends setpoint information and current room temperature information to the ECRVs 602, 603. The ECRVs 602, 603 compare the duct temperature to the room temperature and the setpoint temperature and makes a determination as to whether to open or close the vents. In one embodiment, the ECRVs 602, 603 send information to the zone thermostat 601 regarding the relative position of the vents (e.g., open, closed, partially open, etc.).

In the systems 700, 750, 800, 900 (the centralized systems) the zone thermostats 707, 708 send room temperature and setpoint temperature information to the central system. In one embodiment, the zone thermostats 707, 708 also send temperature slope (e.g., temperature rate of rise or fall) information to the central system. In the systems where the thermostat 720 is provided to the central system or where the central system controls the HVAC system, the central system knows whether the HVAC system is providing heating or cooling; otherwise, the central system used duct temperature information provide by the ECRVs 702-705 to determine whether the HVAC system is heating or cooling. In one embodiment, ECRVs send duct temperature information to the central system. In one embodiment, the central system queries the ECRVs by sending instructions to one or more of the ECRVs 702-705 instructing the ECRV to transmit its duct temperature.

The central system determines how much to open or close ECRVs 702-705 according to the available heating and cooling capacity of the HVAC system and according to the priority of the zones and the difference between the desired temperature and actual temperature of each zone. In one embodiment, the occupants use the zone thermostat 707 to set the setpoint and priority of the zone 711, the zone thermostat 708 to set the setpoint and priority of the zone 712, etc. In one embodiment, the occupants use the central system console 1300 to set the setpoint and priority of each zone, and the zone thermostats to override (either on a permanent or temporary basis) the central settings. In one embodiment, the central console 1300 displays the current temperature, setpoint temperature, temperature slope, and priority of each zone.

In one embodiment, the central system allocates HVAC air to each zone according to the priority of the zone and the temperature of the zone relative to the setpoint temperature of the zone. Thus, for example, in one embodiment, the central system provides relatively more HVAC air to relatively higher priority zones that are not at their temperature setpoint than to lower priority zones or zones that are at or relatively near their setpoint temperature. In one embodiment, the central system avoids closing or partially closing too many vents in order to avoid reducing airflow in the duct below a desired minimum value.

In one embodiment, the central system monitors a temperature rate of rise (or fall) in each zone and sends commands to adjust the amount each ECRV 702-705 is open to bring higher priority zones to a desired temperature without allowing lower-priority zones to stray too far form their respective setpoint temperature.

In one embodiment, the central system uses predictive modeling to calculate an amount of vent opening for each of the ECRVs 702-705 to reduce the number of times the vents are opened and closed and thereby reduce power usage by the actuators 409. In one embodiment, the central system uses a neural network to calculate a desired vent opening for each of the ECRVs 702-705. In one embodiment, various operating parameters such as the capacity of the central HVAC system, the volume of the house, etc., are programmed into the central system for use in calculating vent openings and closings. In one embodiment, the central system is adaptive and is configured to learn operating characteristics of the HVAC system and the ability of the HVAC system to control the temperature of the various zones as the ECRVs 702-705 are opened and closed. In an adaptive learning system, as the central system controls the ECRVs to achieve the desired temperature over a period of time, the central system learns which ECRVs need to be opened, and by how much, to achieve a desired level of heating and cooling for each zone. The use of such an adaptive central system is convenient because the installer is not required to program HVAC operating parameters into the central system. In one embodiment, the central system provides warnings when the HVAC system appears to be operating abnormally, such as, for example, when the temperature of one or more zones does not change as expected (e.g., because the HVAC system is not operating properly, a window or door is open, etc.).

In one embodiment, the adaptation and learning capability of the central system uses different adaptation results (e.g., different coefficients) based on whether the HVAC system is heating or cooling, the outside temperature, a change in the setpoint temperature or priority of the zones, etc. Thus, in one embodiment, the central system uses a first set of adaptation coefficients when the HVAC system is cooling, and a second set of adaptation coefficients when the HVAC system is heating. In one embodiment, the adaptation is based on a predictive model. In one embodiment, the adaptation is based on a neural network.

Figure 17:
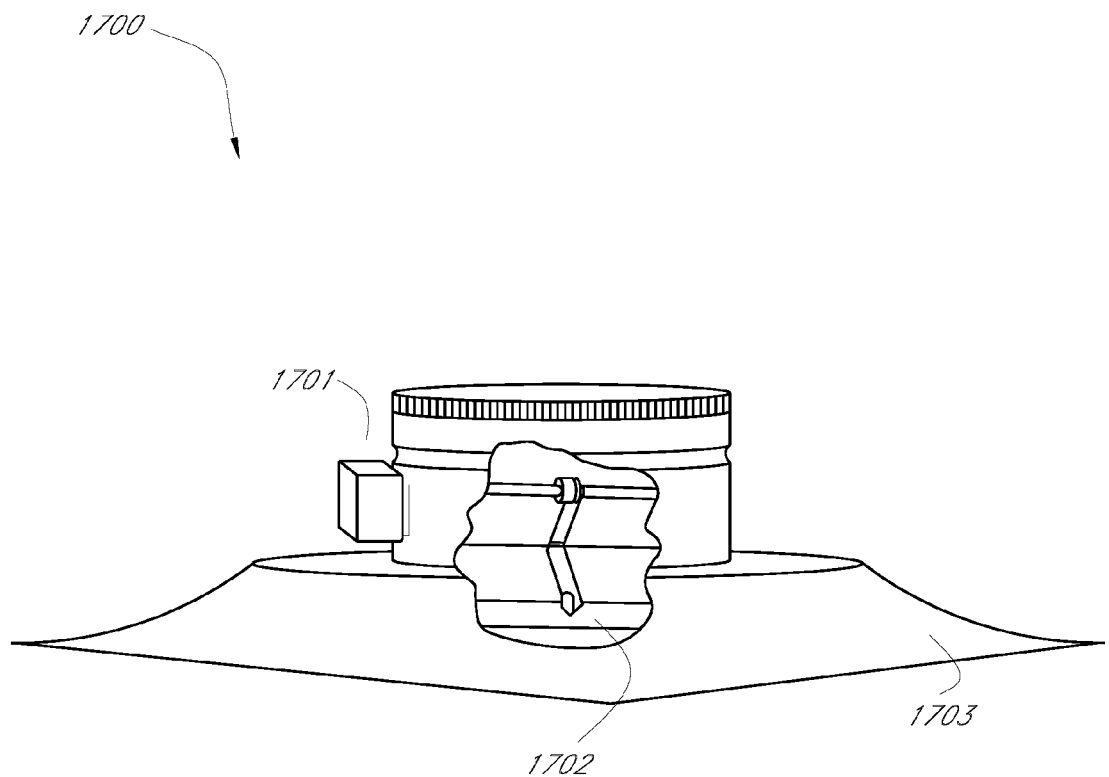
FIG. 17 shows an ECRV configured to be used in connection with a conventional T-bar ceiling system found in many commercial structures.

FIG. 17 shows an ECRV 1700 configured to be used in connection with a conventional T-bar ceiling system found in many commercial structures. In the ECRV 1700, an actuator 1701 (as one embodiment of the actuator 409) is provided to a damper 1702. The damper 1702 is provided to a diffuser 1703 that is configured to mount in a conventional T-bar ceiling system. The ECRV 1700 can be connected to a zoned thermostat or central system by wireless or wired communication.

In one embodiment, the sensors 407 in the ECRVs include airflow and/or air velocity sensors. Data from the sensors 407 are transmitted by the ECRV to the central system. The central system uses the airflow and/or air velocity measurements to determine the relative amount of air through each ECRV. Thus, for example, by using airflow/velocity measurements, the central system can adapt to the relatively lower airflow of smaller ECRVs and ECRVs that are situated on the duct further from the HVAC blower than ECRVs which are located closer to the blower (the closer ECRVs tend to receive more airflow).

FIG. 18 shows a register vent 1800 configured to use a scrolling curtain 1801 to control airflow as an alternative to the vanes shown in FIGS. 2 and 3. An actuator 1802 (one embodiment of the actuator 409) is provided to the curtain 1801 to move the curtain 1801 across the register to control the size of a register airflow opening. In one embodiment, the curtain 1801 is guided and held in position by a track 1803.

In one embodiment, the actuator 1802 is a rotational actuator and the scrolling curtain 1801 is rolled around the actuator 1802, and the register vent 1800 is open and rigid enough to be pushed into the vent opening by the actuator 1802 when the actuator 1802 rotates to unroll the curtain 1801.

Figure 19:
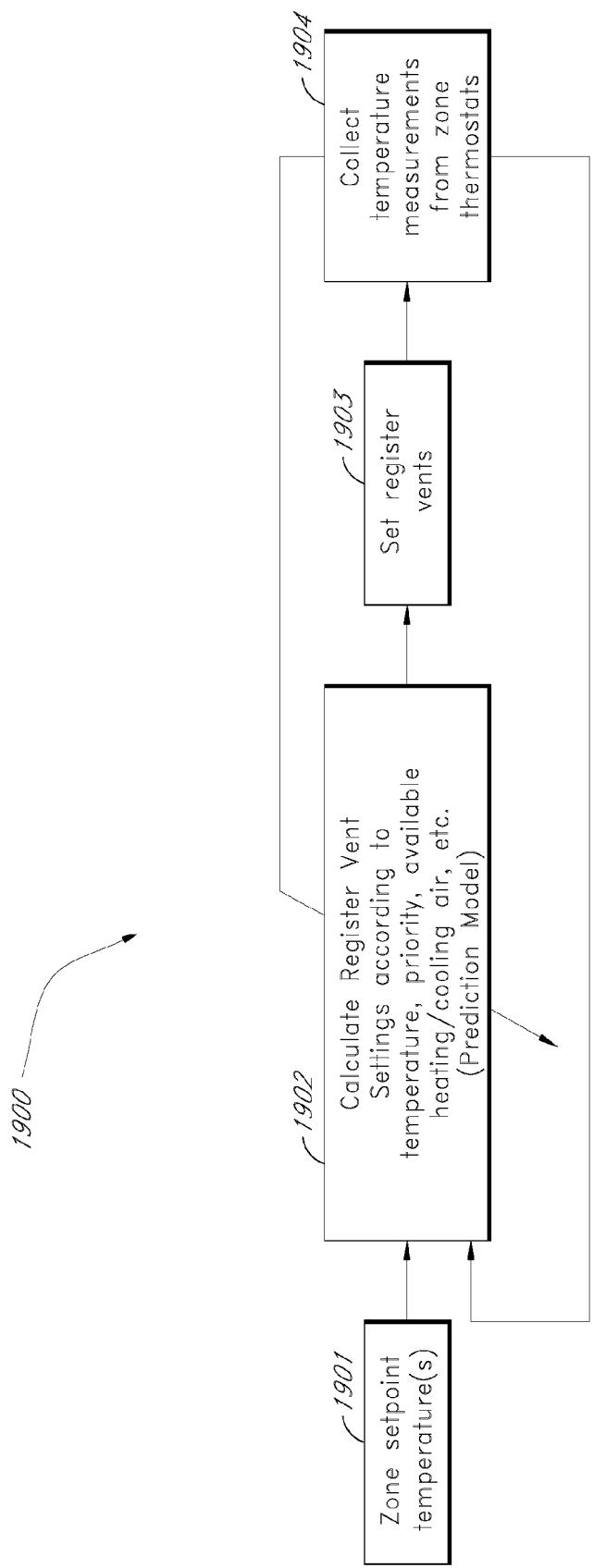
FIG. 19 is a block diagram of a control algorithm for controlling the register vents.

In one embodiment, the actuator 1802 is a rotational actuator and the scrolling curtain 1801 is rolled around the actuator 1802, and the register vent 1800 is open and rigid enough to be pushed into the vent opening by the actuator 1802 when the actuator 1802 rotates to unroll the curtain 1801. In one embodiment, the actuator 1802 is configured to FIG. 19 is a block diagram of a control algorithm 1900 for controlling the register vents. For purposes of explanation, and not by way of limitation, the algorithm 1900 is described herein as running on the central system. However, one of ordinary skill in the art will recognize that the algorithm 1900 can be run by the central system, by the zone thermostat, by the ECRV, or the algorithm 1900 can be distributed among the central system, the zone thermostat, and the ECRV. In the algorithm 1900, in a block 1901 of the algorithm 1900, the setpoint temperatures from one or more zone thermostats are provided to a calculation block 1902. The calculation block 1902 calculates the register vent settings (e.g., how much to open or close each register vent) according to the zone temperature, the zone priority, the available heating and cooling air, the previous register vent settings, etc. as described above. In one embodiment, the block 1902 uses a predictive model as described above. In one embodiment, the block 1902 calculates the register vent settings for each zone independently (e.g., without regard to interactions between zones). In one embodiment, the block 1902 calculates the register vent settings for each zone in a coupled-zone manner that includes interactions between zones. In one embodiment, the calculation block 1902 calculates new vent openings by taking into account the current vent openings and in a manner configured to minimize the power consumed by opening and closing the register vents.

Register vent settings from the block 1902 are provided to each of the register vent actuators in a block 1903, wherein the register vents are moved to new opening positions as desired (and, optionally, one or more of the fans 402 are turned on to pull additional air from desired ducts). After setting the new vent openings in the block 1903, the process advances to a block 1904 where new zone temperatures are obtained from the zone thermostats (the new zone temperatures being responsive to the new register vent settings made in block 1903). The new zone temperatures are provided to an adaptation input of the block 1902 to be used in adapting a predictive model used by the block 1902. The new zone temperatures also provided to a temperature input of the block 1902 to be used in calculating new register vent settings.

As described above, in one embodiment, the algorithm used in the calculation block 1902 is configured to predict the ECRV opening needed to bring each zone to the desired temperature based on the current temperature, the available heating and cooling, the amount of air available through each ECRV, etc. The calculating block uses the prediction model to attempt to calculate the ECRV openings needed for relatively long periods of time in order to reduce the power consumed in unnecessarily by opening and closing the register vents. In one embodiment, the ECRVs are battery powered, and thus reducing the movement of the register vents extends the life of the batteries. In one embodiment, the block 1902 uses a predictive model that learns the characteristics of the HVAC system and the various zones and thus the model prediction tends to improve over time.

In one embodiment, the zone thermostats report zone temperatures to the central system and/or the ECRVs at regular intervals. In one embodiment, the zone thermostats report zone temperatures to the central system and/or the ECRVs after the zone temperature has changed by a specified amount specified by a threshold value. In one embodiment, the zone thermostats report zone temperatures to the central system and/or the ECRVs in response to a request instruction from the central system or ECRV.

In one embodiment, the zone thermostats report setpoint temperatures and zone priority values to the central system or ECRVs whenever the occupants change the setpoint temperatures or zone priority values using the user controls 1102. In one embodiment, the zone thermostats report setpoint temperatures and zone priority values to the central system or ECRVs in response to a request instruction from the central system or ECRVs.

In one embodiment, the occupants can choose the thermostat deadband value (e.g., the hysteresis value) used by the calculation block 1902. A relatively larger deadband value reduces the movement of the register vent at the expense of larger temperature variations in the zone.

In one embodiment, the ECRVs report sensor data (e.g., duct temperature, airflow, air velocity, power status, actuator position, etc.) to the central system and/or the zone thermostats at regular intervals. In one embodiment, the ECRVs report sensor data to the central system and/or the zone thermostats whenever the sensor data fails a threshold test (e.g., exceeds a threshold value, falls below a threshold value, falls inside a threshold range, or falls outside a threshold range, etc.). In one embodiment, the ECRVs report sensor data to the central system and/or the zone thermostats in response to a request instruction from the central system or zone thermostat.

In one embodiment, the fans 402 can be used as generators to provide power to recharge the power source 404 in the ECRV. However, using the fan 402 in such a manner restricts airflow through the ECRV. In one embodiment, the controller 401 calculates a vent opening for the ECRV to produce the desired amount of air through the ECRV while using the fan to generate power to recharge the power source 404 (thus, in such circumstance) the controller would open the vanes more than otherwise necessary in order to compensate for the air resistance of the generator fan 402. In one embodiment, in order to save power in the ECRV, rather than increase the vane opening, the controller 401 can use the fan as a generator. The controller 401 can direct the power generated by the fan 402 into one or both of the power sources 404, 405, or the controller 401 can dump the excess power from the fan into a resistive load. In one embodiment, the controller 401 makes decisions regarding vent opening versus fan usage. In one embodiment, the central system instructs the controller 401 when to use the vent opening and when to use the fan. In one embodiment, the controller 401 and central system negotiate vent opening versus fan usage.

In one embodiment, the ECRV reports its power status to the central system or zone thermostat. In one embodiment the central system or zone thermostat takes such power status into account when determining new ECRV openings. Thus, for example, if there are first and second ECRVs serving one zone and the central system knows that the first ECRVs is low on power, the central system will use the second ECRV to modulate the air into the zone. If the first ECRV is able to use the fan 402 or other airflow-based generator to generate electrical power, the central system will instruct the second ECRV to a relatively closed position in and direct relatively more airflow through the first ECRV when directing air into the zone.

In one embodiment, the central system is shown in FIGS. 7-9 is implemented in a distributed fashion in the zone thermostats 1100 and/or in the ECRVs. In the distributed system, the central system does not necessarily exists as a distinct device, rather, the functions of the central system can be are distributed in the zone thermostats 1100 and/or the ECRVs. Thus, in a distributed system, FIGS. 7-9 represent a conceptual/computational model of the system. For example, in a distributed system, each zone thermostat 100 knows its zone priority, and the zone thermostats 1100 in the distributed system negotiate to allocate the available heating/cooling air among the zones. In one embodiment of a distributed system, one of the zone thermostat assumes the role of a master thermostat that collects data from the other zone thermostats and implements the calculation block 1902. In one embodiment of a distributed system, the zone thermostats operate in a peer-to-peer fashion, and the calculation block 1902 is implemented in a distributed manner across a plurality of zone thermostats and/or ECRVs.

It will be evident to those skilled in the art that the invention is not limited to the details of the foregoing illustrated embodiments and that the present invention may be embodied in other specific forms without departing from the spirit or essential attributed thereof; furthermore, various omissions, substitutions and changes may be made without departing from the spirit of the inventions. For example, although specific embodiments are described in terms of the 900 MHz frequency band, one of ordinary skill in the art will recognize that frequency bands above and below 900 MHz can be used as well. The wireless system can be configured to operate on one or more frequency bands, such as, for example, the HF band, the VHF band, the UHF band, the Microwave band, the Millimeter wave band, etc. One of ordinary skill in the art will further recognize that techniques other than spread spectrum can also be used and/or can be used instead spread spectrum. The modulation uses is not limited to any particular modulation method, such that modulation scheme used can be, for example, frequency modulation, phase modulation, amplitude modulation, combinations thereof, etc. The one or more of the wireless communication systems described above can be replaced by wired communication. The one or more of the wireless communication systems described above can be replaced by powerline networking communication. The foregoing description of the embodiments is, therefore, to be considered in all respects as illustrative and not restrictive, with the scope of the invention being delineated by the appended claims and their equivalents.

What is claimed is:

1. A zone thermostat, comprising:
   a controller;
   a temperature sensor provided to said controller, said temperature sensor configured to measure a temperature of air in a first zone;
   a display device;
   at least one user input device; and
   a communication system provided to said controller, said controller configured to communicate temperature readings to a zone control system, said at least one user input device configured to allow a user to specify a zone setpoint temperature and a zone priority for a zone corresponding to said zone thermostat, said controller configured to communicate said setpoint temperature and said zone priority to said zone control system, said controller configured to display said zone priority on said display device.

2. The zone thermostat of claim 1, said controller further configured to relay communications between said zone control system and one or more electronically-controlled register vents configured to provide air to said first zone.

3. The zone thermostat of claim 1, wherein said controller is configured to transmit sensor data according to a threshold test.

4. The zone thermostat of claim 3, wherein said threshold test comprises a high threshold level.

5. The zone thermostat of claim 3, wherein said threshold test comprises a low threshold level.

6. The zone thermostat of claim 3, wherein said threshold test comprises an inner threshold range.

7. The zone thermostat of claim 3, wherein said threshold test comprises an outer threshold range.

8. The zone thermostat of claim 1, wherein controller is configured to receive an instruction to change a status reporting interval.

9. The zone thermostat of claim 1, wherein controller is configured to receive an instruction to change a sensor data reporting interval.

10. The zone thermostat of claim 1, wherein said zone thermostat is configured to monitor a status of one or more electronically-controlled register vents.

11. The zone thermostat of claim 1, wherein said wireless communication system comprises a wireless communication system.

12. The zone thermostat of claim 11, wherein said wireless communication system communicates comprises an infrared communication system.

13. The zone thermostat of claim 11, wherein said wireless communication system comprises an ultrasonic communication system.

14. The zone thermostat of claim 11, wherein said wireless communication comprises a radio-frequency communication system.

15. The zone thermostat of claim 1, wherein said communication system comprises a frequency-hopping system.

16. The zone thermostat of claim 1, wherein said communication system communicates using a 900 megahertz band.

17. The zone thermostat of claim 1, further comprising a visual indicator to indicate a low-power condition.

18. The zone thermostat of claim 1, said controller configured to use a predictive model to compute a control program for an electronically-controlled register vent, said control program configured to reduce power consumption by said electrically-controlled register vent.

19. The zone thermostat of claim 18, said control program configured to reduce a number of times said electronically-controlled register vent is opened and closed.

20. The zone thermostat of claim 18, said control program configured to reduce movement of at least one actuator in said electronically-controlled register vent.

21. The zone thermostat of claim 1, said zone thermostat configured to use a predictive model to compute a control program for said electronically-controlled register vent, said control program configured to reduce power consumption by said electronically-controlled register vent.

22. The zone thermostat of claim 1, said controller configured to send data to an electronically-controlled register vent.

23. The zone thermostat of claim 1, said zone thermostat further comprising an identification code.

24. The zone thermostat of claim 1, said zone thermostat configured to send humidity data to said controller.

25. The zone thermostat of claim 1, said zone thermostat configured to send zone temperature slope data to said controller.

26. The zone thermostat of claim 1, further comprising a remote control interface.

27. The zone thermostat of claim 1, said zone thermostat further comprising an occupant sensor.

28. The zone thermostat of claim 1, said zone thermostat further comprising a light switch, said zone thermostat and said light switch configured to be installed in a standard electrical wall switch enclosure.

* * * * *